(12) United States Patent
Nagai

(10) Patent No.: US 9,671,289 B2
(45) Date of Patent: Jun. 6, 2017

(54) COLOR MEASUREMENT DEVICE AND COLOR MEASUREMENT METHOD

(71) Applicant: Konica Minolta, Inc., Tokyo (JP)

(72) Inventor: Yoshiroh Nagai, Hyogo (JP)

(73) Assignee: Konica Minolta, Inc., Tokyo (JP)

( * ) Notice: Subject to any disclaimer, the term of this patent is extended or adjusted under 35 U.S.C. 154(b) by 0 days.

(21) Appl. No.: 15/307,392

(22) PCT Filed: Apr. 14, 2015

(86) PCT No.: PCT/JP2015/061432
§ 371 (c)(1),
(2) Date: Oct. 28, 2016

(87) PCT Pub. No.: WO2015/166797
PCT Pub. Date: Nov. 5, 2015

(65) Prior Publication Data
US 2017/0052068 A1    Feb. 23, 2017

(30) Foreign Application Priority Data
Apr. 28, 2014   (JP) ................................ 2014-092621

(51) Int. Cl.
G01J 3/52    (2006.01)
G01J 3/50    (2006.01)

(52) U.S. Cl.
CPC .. G01J 3/52 (2013.01); G01J 3/50 (2013.01)

(58) Field of Classification Search
CPC ..................................... G01J 3/50; G01J 3/52
USPC ........................................................ 356/421
See application file for complete search history.

(56) References Cited

U.S. PATENT DOCUMENTS

| 6,765,674 | B2 | 7/2004 | Orelli et al. |
| 2006/0268374 | A1* | 11/2006 | Kim .................. G01D 5/34776 358/497 |
| 2013/0250322 | A1* | 9/2013 | Kawabata ................ H04N 1/60 358/1.9 |

OTHER PUBLICATIONS

International Search Report issued in corresponding application No. PCT/JP2015/061432 mailed Jul. 7, 2015 (3 pages).
Written Opinion of the International Searching Authority issued in corresponding application No. PCT/JP2015/061432 mailed Jul. 7, 2015 (3 pages).

* cited by examiner

Primary Examiner — Sunghee Y Gray
(74) Attorney, Agent, or Firm — Osha Liang LLP

(57) ABSTRACT

In this color measurement device and method, an entire image and a partial image of a color chart are acquired, respectively, during conveyance of the color chart by a conveyance unit and during re-conveyance of the color chart by the conveyance unit, and an amount of positional deviation of the color chart occurring between the conveyance and the re-conveyance is derived based on the acquired entire and partial images. Then, a color of each of a plurality of patches of the color chart is measured by a color measuring unit, while a measurement position of the color measuring unit is corrected according to the derived positional deviation amount.

9 Claims, 17 Drawing Sheets

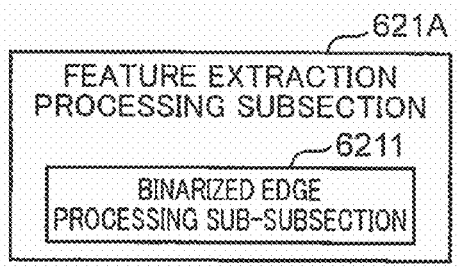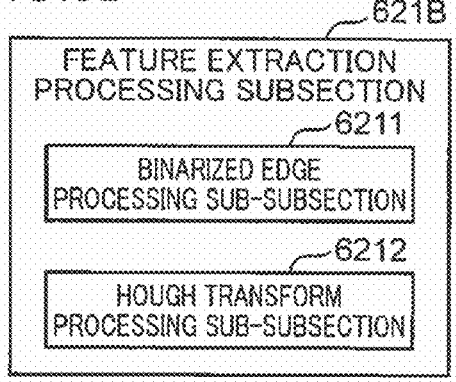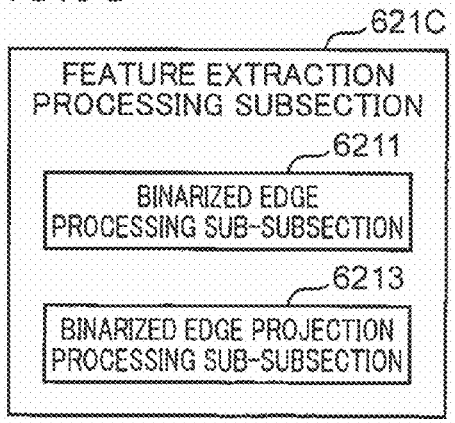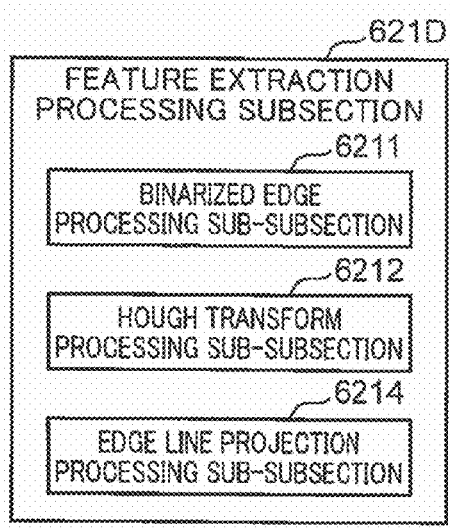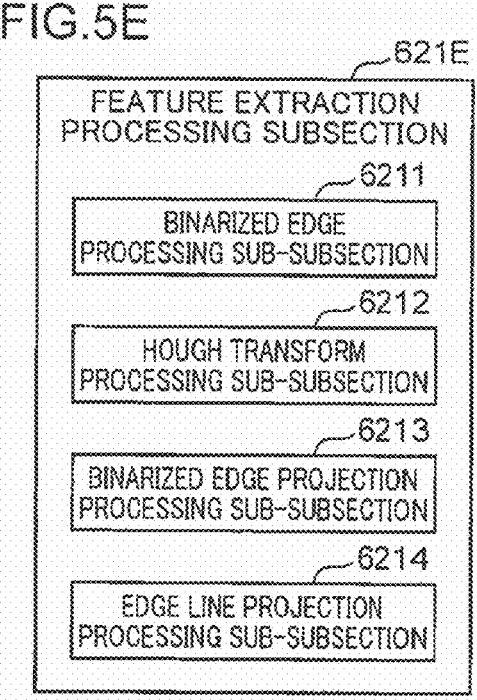

EDGE LINES (—), INTERMEDIATE LINES (···) AND PATCH CENTER POSITION (○)

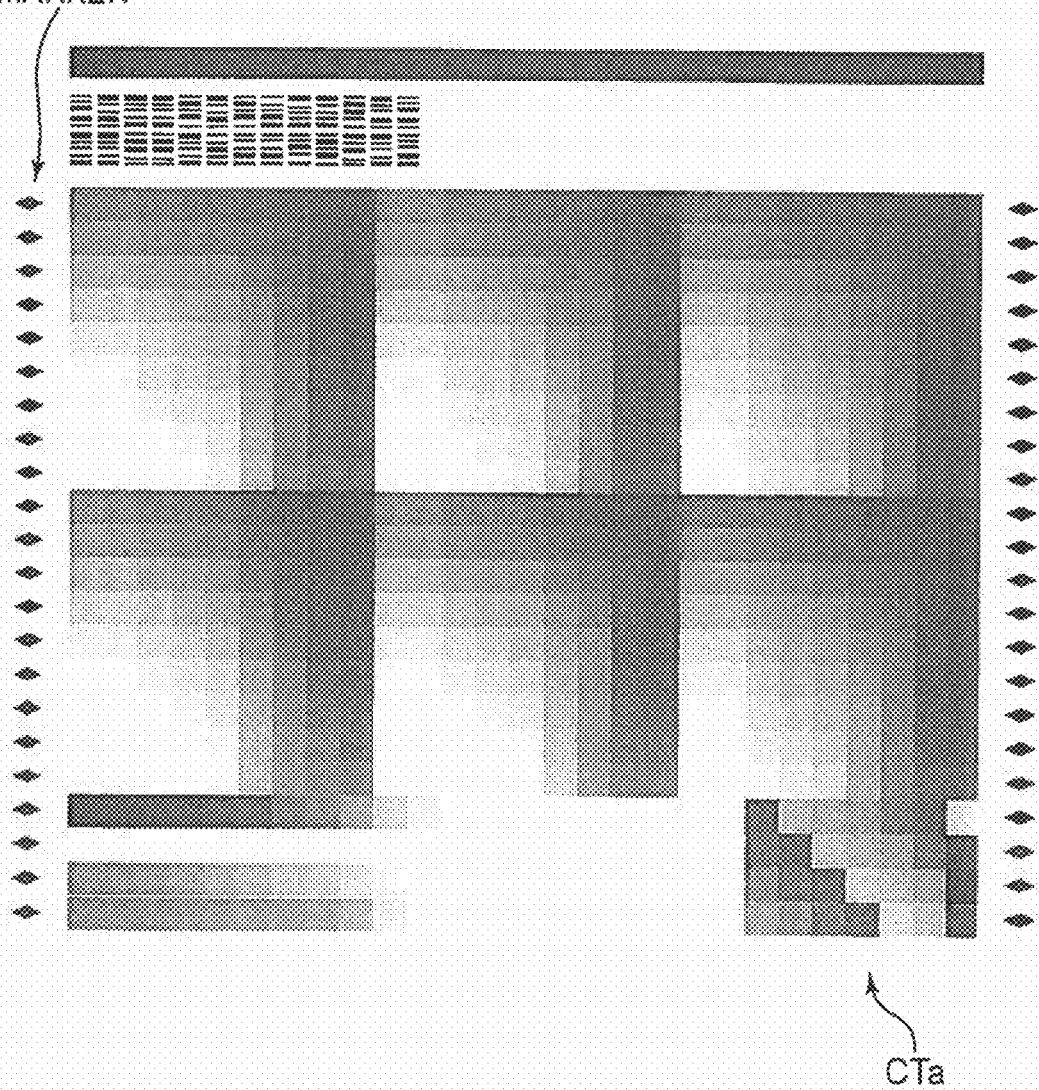

COLOR MEASUREMENT DEVICE AND COLOR MEASUREMENT METHOD

TECHNICAL FIELD

The present invention relates to a color measurement device and method for measuring a color, and more particularly to a color measurement device and method capable of measuring a color at a proper position automatically.

BACKGROUND ART

In a company specializing in creating color printed materials, such as a printing company, in order to maintain quality of printed materials, colors of a printed material are measured to adjust colors of a printing unit which has printed the printed material, on a regular basis. In such color adjustment for a printing unit, for example, original image data, called "color chart", is printed by the printing unit, and respective colors of a plurality of patches of the printed color chart are measured by a color measurement device. An amount of color deviation between an actual measured value and a target value of a color of each patch is evaluated, and, according to a result of the evaluation, colors of the printing unit are adjusted.

The color chart is constructed such that it includes a plurality of color samples, called "patches", as mentioned above, wherein each of the patches are formed differently in terms of color (hue, brightness (luminosity), chroma (colorfulness, saturation)), and arranged in a given manner. Such a color chart includes various types. For example, there is one type of color chart constructed such that a plurality of quadrangular-shaped patches having various colors are arranged in horizontal and vertical directions in a two-dimensional array configuration. In this type of color chart, depending on intended contents of the evaluation, there are various patterns, such as a pattern in which the patches are arranged to form a random (arbitrary) color array, and a pattern in which the patches are arranged such that a change in shade between adjacent ones of the patches becomes smaller, like a gradation. This type of color chart includes not only a color chart which is created by a user using a color chart creation tool provided from a manufacturer of color measurement devices, but also a color chart which is provided from a public agency. As above, a color chart can have a significantly wide variety of patterns by differences in shape, arrangement, color combination and others of the patches.

Meanwhile, the number of colors for use in color adjustment for a printing unit has been increasing year after year. Accordingly, the number of patches arranged in a color chart has also been increasing, wherein a size (area) of each patch is relatively small.

From such a circumstance, it has become practically impossible to manually accurately adjust a position of a measuring section of a color measurement device with respect to each patch, so as to perform a color measurement. For this reason, there is a need for an automatic system for automatically measuring a position of each patch, and automatically adjusting a position of the measuring section of the color measurement device to become coincident with the measured position of the patch, so as to measure a color of the patch. As one example of this system, Gretag-Macbeth AG proposed a method which comprises: taking a two-dimensional color image of a color chart to be measured; calculating a position of each patch by an image processing technique using a computer; and moving a color measuring head to the determined position of the patch so as to measure colors of the color chart, as described in the following Patent Literature 1.

In this connection, it is conceivable to take an entire image of a color chart while feeding a color chart sheet along a given one direction, e.g., forwardly, to thereby measure a position of each patch, and then adjust a position of a measuring section of a color measurement device to become coincident with the measured position of the patch, while re-feeding the color chart sheet, e.g., in a direction opposite to that of the forward feeding, i.e., backwardly. In this case, however, reproducibility of a position of the color chart sheet is undesirably deteriorated due to influences of slipping of the sheet, backlash and others. As a result, when the measuring section of the color measurement device is moved to the measured position of the patch, the measuring section of the color measurement device is likely to deviate from an actual position of the patch, thereby leading to difficulty in properly measuring a color of each patch by the color measurement device.

CITATION LIST

Patent Literature

Patent Literature 1: U.S. Pat. No. 6,765,674 B

SUMMARY OF INVENTION

One or more embodiments of the invention provide a color measurement device and method capable of correcting a positional deviation of a color chart occurring between a conveyance and a re-conveyance along one direction of the color chart, to measure a color of each patch at a more proper position.

In the color measurement device and method, an entire image and a partial image of a color chart are acquired, respectively, during conveyance of the color chart by a conveyance unit and during re-conveyance of the color chart by the conveyance unit, and an amount of positional deviation of the color chart occurring between the conveyance and the re-conveyance is derived based on the acquired entire and partial images. Then, a color of each of a plurality of patches of the color chart is measured by a color measuring unit, while a measurement position of the color measuring unit is corrected according to the derived positional deviation amount. Thus, the color measurement device and method make it possible to correct the positional deviation of the color chart occurring between the conveyance and the re-conveyance along one direction to measure each patch at a more proper position.

The above and other objects, features and advantages of the present invention will be apparent from the following detailed description and the accompanying drawings.

BRIEF DESCRIPTION OF DRAWINGS

FIG. 5A is a block diagram depicting configurations of various types of feature extraction processing subsections in the color measurement device in accordance with one or more embodiments.

FIG. 5B is a second block diagram depicting configurations of various types of feature extraction processing subsections in the color measurement device in accordance with one or more embodiments.

FIG. 5C is a third block diagram depicting configurations of various types of feature extraction processing subsections in the color measurement device in accordance with one or more embodiments.

FIG. 5D is a fourth block diagram depicting configurations of various types of feature extraction processing subsections in the color measurement device in accordance with one or more embodiments.

FIG. 5E is a fifth block diagram depicting configurations of various types of feature extraction processing subsections in the color measurement device in accordance with one or more embodiments.

FIG. 27 is a diagram depicting, as another example, an entire image of a color chart including a plurality of position detection markers.

DESCRIPTION OF EMBODIMENTS

Based on the drawings, embodiments of the present invention will now be described. It should be noted that elements or components assigned with the same reference sign in the figures means that they are identical, and therefore duplicated description thereof will be omitted appropriately. In this specification, for a generic term, a reference sign without any suffix is assigned thereto, and, for a term meaning an individual element or component, a reference sign with a suffix is assigned thereto.

Figure 1:
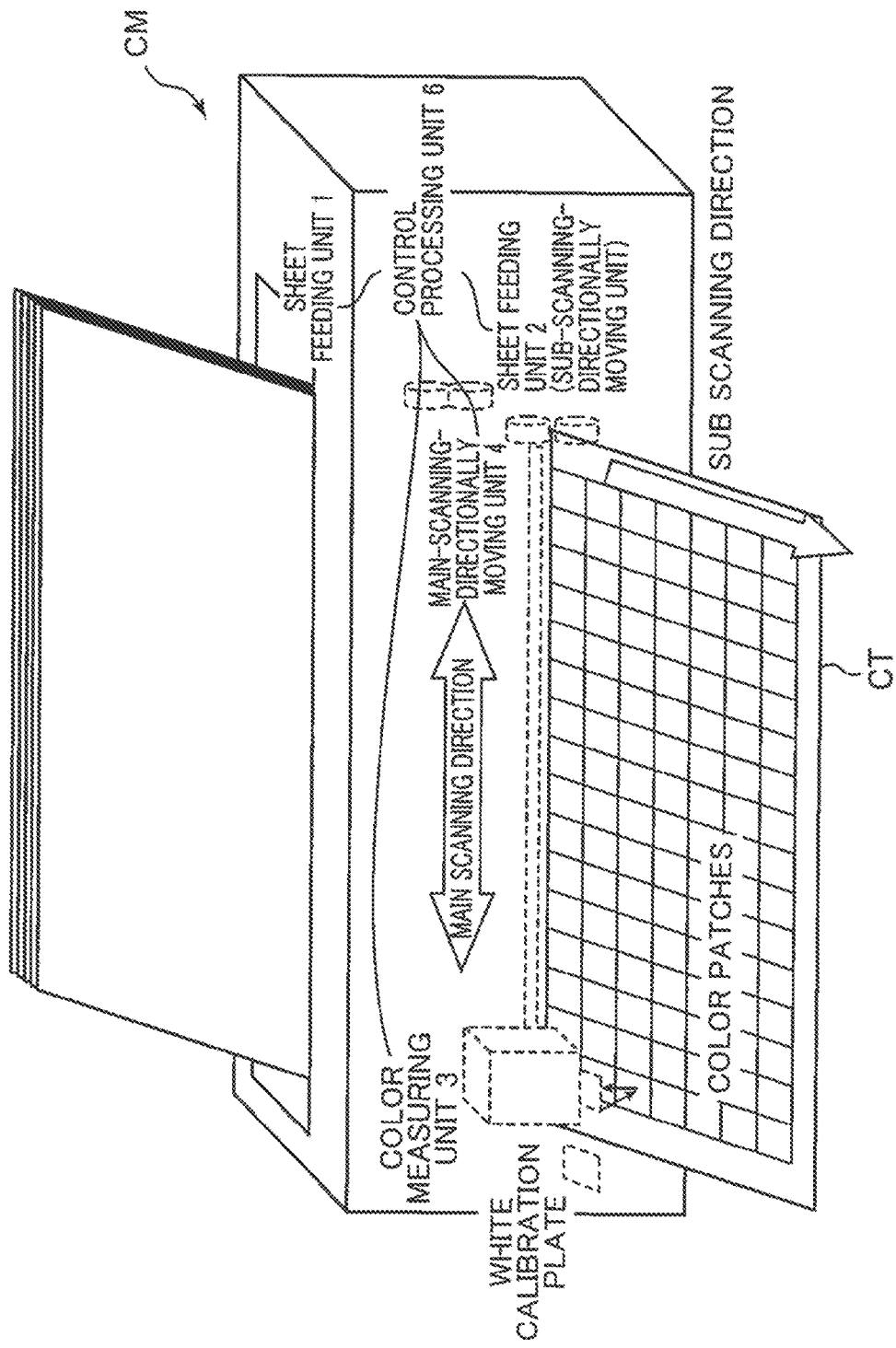
FIG. 1 is a perspective view depicting a schematic configuration of a color measurement device in accordance with one or more embodiments.
Figure 2:
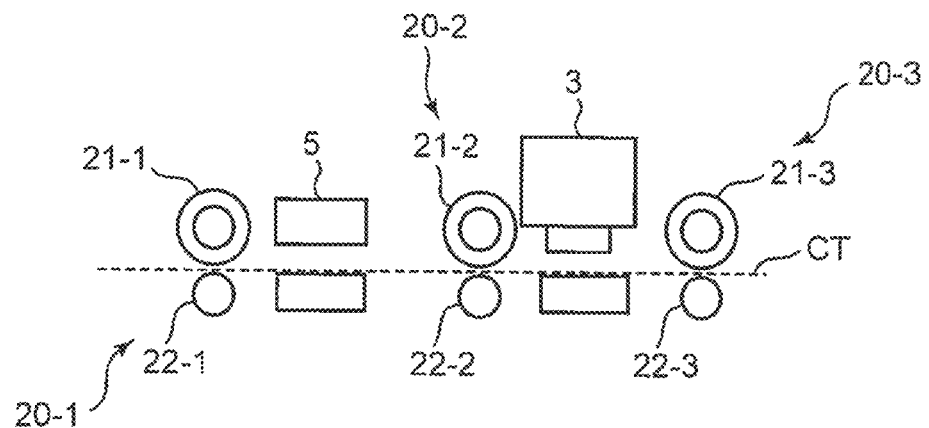
FIG. 2 is a schematic side view depicting an arrangement relationship between an imaging unit and a color measuring unit in the color measurement device in accordance with one or more embodiments.
Figure 3:
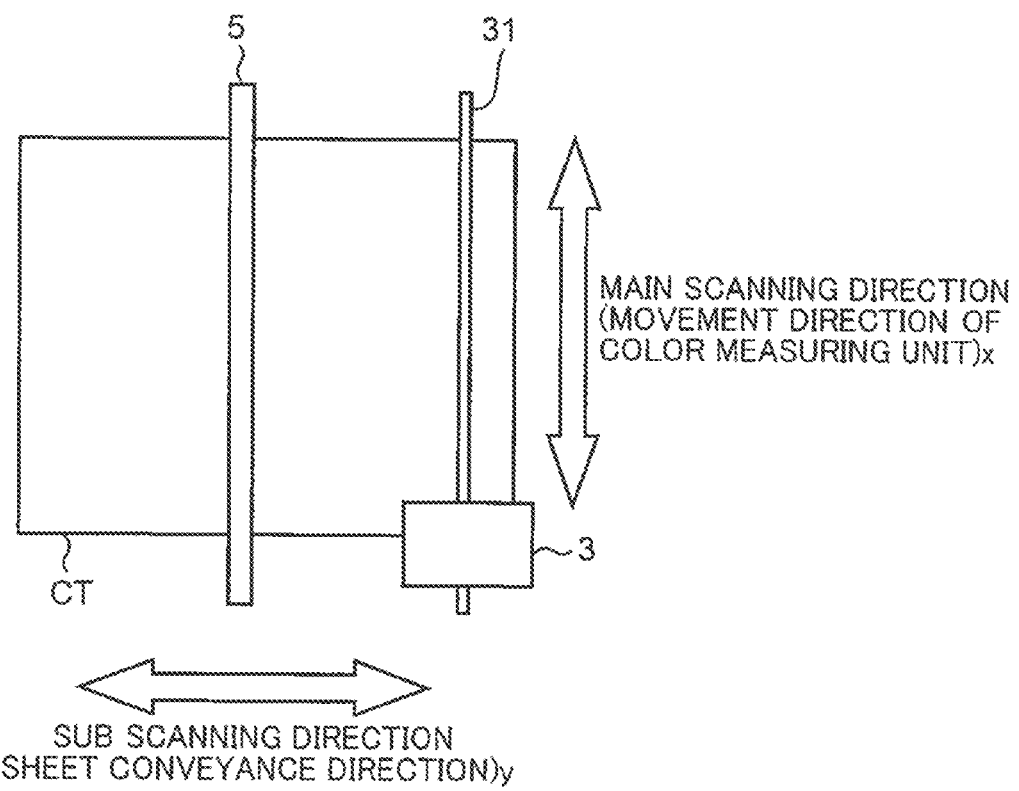
FIG. 3 is a schematic top view depicting the arrangement relationship between the imaging unit and the color measuring unit in the color measurement device in accordance with one or more embodiments.
Figure 4:
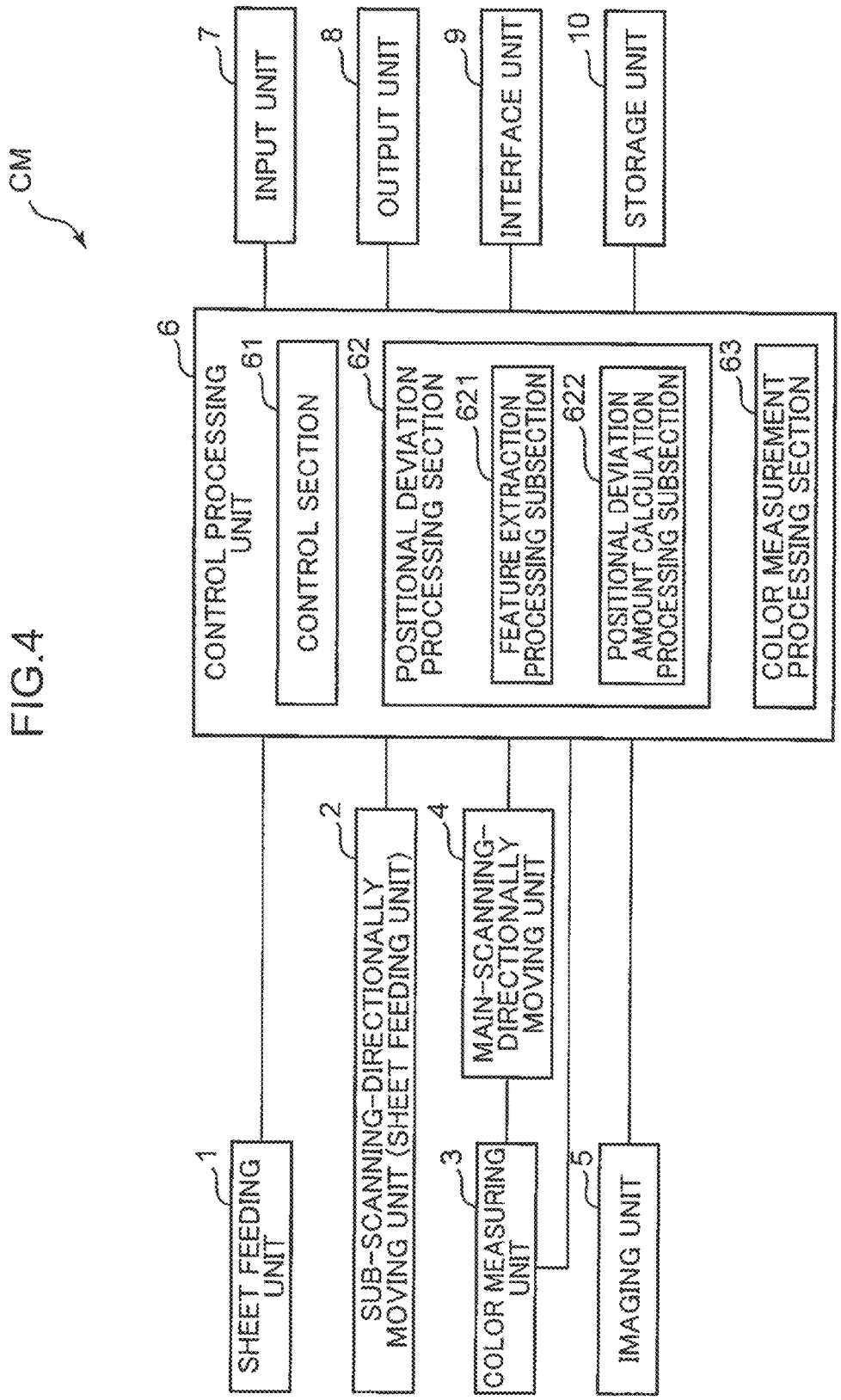
FIG. 4 is a block diagram depicting an electrical configuration of the color measurement device in accordance with one or more embodiments.

FIG. 1 is a perspective view depicting a schematic configuration of a color measurement device in accordance with one or more embodiments. FIG. 2 is a schematic side view depicting an arrangement relationship between an imaging unit and a color measuring unit in the color measurement device in accordance with one or more embodiments. FIG. 3 is a schematic top view depicting the arrangement relationship between the imaging unit and the color measuring unit in the color measurement device in accordance with one or more embodiments. FIG. 4 is a block diagram depicting an electrical configuration of the color measurement device in accordance with one or more embodiments. FIG. 5 is a block diagram depicting configurations of various types of feature extraction processing subsections in the color measurement device in accordance with one or more embodiments. Specifically, FIGS. 5A to 5E depict, respectively, configurations of first to fifth types of feature extraction processing subsections.

The color measurement device CM in accordance with one or more embodiments is a device for measuring a color (hue, brightness (luminosity), chroma (colorfulness, saturation)) of a measurement target. For example, it includes a sheet feeding unit 1, a sub-scanning-directionally moving unit (sheet feeding unit) 2, a color measuring unit 3, a main-scanning-directionally moving unit 4, an imaging unit 5, a control processing unit 6, an input unit 7, an output unit 8, an interface unit (IF unit) 9, and a storage unit 10, as depicted in FIGS. 1 to 4.

The sheet feeding unit 1 is a sheet conveying mechanism which is connected to the control processing unit 6 and is operable, according to control of the control processing unit 6, to introduce a measurement target sheet set in the color measurement device CM, into an inside of the color measurement device CM. The measurement target sheet may be any type. For example, in the case where colors of a printing unit are adjusted, it may be a color chart CT having a plurality of patches each of which is a region of a given color. For example, the sheet feeding unit 1 includes: a reservoir section capable of reserving a measurement target sheet; an introduction section capable of picking up the measurement target sheet reserved in the reservoir section and introducing the measurement target sheet into the inside of the color measurement device CM, wherein it is constructed, for example, such that it includes a pick-up roller; and a delivery section capable of delivering the measurement target sheet introduced by the introduction section, to the sub-scanning-directionally moving unit 2, wherein it is constructed, for example, such that it comprises a conveyance roller.

The sub-scanning-directionally moving unit (sheet feeding unit) 2 is a sheet conveyance mechanism which is connected to the control processing unit 6 and is operable, according to control of the control processing unit 6, to convey the measurement target sheet delivered from the sheet feeding unit 1, in a sub scanning direction (second direction) orthogonal to a first direction preliminarily set as a main scanning direction. The sub-scanning-directionally moving unit 2 is constructed such that it can convey a measurement target sheet along the sub scanning direction, in two modes: forward feeding; and backward feeding. The forward feeding is equivalent to one example of "conveyance". For example, it means conveying a measurement target sheet from an upstream side (the side of the sheet feeding unit 1) toward a downstream side (discharge side). The backward feeding is equivalent to one example of "re-conveyance". For example, it means conveying a measurement target sheet in a direction opposite to a direction of the forward feeding, i.e., from the downstream side toward the upstream side. The sub-scanning-directionally moving unit 2 is constructed, for example, such that it includes a plurality of sheet conveyance roller assemblies, and a drive section capable of rotationally driving the sheet conveyance roller assemblies. Each of the sheet conveyance roller assemblies is constructed such that it includes a drive roller capable of being rotationally driven by the drive section, and a driven roller capable of being rotationally driven according to rotational driving of the drive roller. More specifically, in the example depicted in FIG. 2, the sub-scanning-directionally moving unit 2 includes three, first to third, sheet conveyance roller assemblies 20-1 to 20-3. The first to third sheet conveyance roller assemblies 20-1 to 20-3 are arranged from the upstream side toward the downstream side along the sub scanning direction. Each of the first to third sheet conveyance roller assemblies 20-1 to 20-3 includes a corresponding one of first to third drive rollers 21-1 to 21-3 and a corresponding one of first to third driven rollers 22-1 to 22-3. In the forward feeding, a measurement target sheet delivered from the sheet feeding unit 1 is nipped between a pair of the first drive roller 21-1 and the first driven roller 22-1, and the first drive roller 21-1 is rotationally driven in a normal rotation direction (e.g., clockwise direction) by the drive section, so that the measurement target sheet is conveyed from the first sheet conveyance roller assembly 20-1 to the second sheet conveyance roller assembly 20-2. The measurement target sheet conveyed to the second sheet conveyance roller assembly 20-2 is conveyed from the second sheet conveyance roller assembly 20-2 to the third sheet conveyance roller assembly 20-3 by the second sheet conveyance roller assembly 20-2, in the same manner as above. Then, the measurement target sheet conveyed to the third sheet conveyance roller assembly 20-3 is conveyed from the third sheet conveyance roller assembly 20-3 to the downstream side by the third sheet conveyance roller assembly 20-3, in the same manner as above. In the backward feeding, each of the first to third drive rollers 21-1 to 21-3 are rotationally driven in a reverse direction (in the above example, counterclockwise direction) by the drive section, in an opposite way with respect to the forward feeding mode, so that the measurement target sheet is conveyed from the downstream side toward the upstream side.

The following description will be made on the assumption that the main scanning direction (first direction) is defined as an x direction (horizontal direction), wherein an coordinate axis set along the x direction is defined as an x axis, and the sub scanning direction (second direction) is defined as a y direction (vertical direction), wherein an coordinate axis set along the y direction is defined as a y axis. These terms will hereinafter be used appropriately.

The color measuring unit 3 is a device which is connected to the control processing unit 6 and is operable, according to control of the control processing unit 6, to measure a color of a measurement target. For example, the color measuring unit 3 may be a color measurement sensor capable of acquiring given optical information about a measurement target so as to derive a color of the measurement target. In one example, the color measuring unit 3 is a spectrophotometric colorimeter which is equipped with a spectroscopic optical element and a photoelectric conversion element for measuring a reflectance (or transmittance) at each wavelength, and is operable to measure a color of an object based on the reflectance (or transmittance) at each wavelength. In another example, the color measuring unit 3 is a tristimulus value-type colorimeter which is equipped with an optical filter and a photoelectric conversion element for measuring tristimulus values of R, G and B components, and is operable to measure a color of an object based on a color difference between the tristimulus values. The color measuring unit 3 can be calibrated by a white calibration, i.e., by measuring a so-called white calibration plate (reference white plate) capable of reflecting wavelengths in a measurement range at a high reflectance (e.g., about 90% to about 99%).

The main-scanning-directionally moving unit 4 is a moving mechanism which is connected to the control processing unit 6 and is operable, according to control of the control processing unit 6, to move the color measuring unit 3 in the main scanning direction (first direction). The main-scanning-directionally moving unit 4 is constructed, for example, such that it includes: a guide member for guiding the color measuring unit 3; a feed mechanism, such as a rack and pinion assembly (rack-and-pinion) or a feed screw, capable of moving the color measuring unit 3 while being guided by the guide member; and a feed mechanism drive section, such as a stepping motor, capable of driving the feed mechanism. In one example, as depicted in FIG. 3, the main-scanning-directionally moving unit 4 is equipped with a rack 31 prepared by cutting teeth on a flat plate-shaped rod and disposed to extend along the main scanning direction, and a pinion (not depicted) provided in the color measuring unit 3 and capable of being rotationally driven, for example, by a stepping motor, wherein the pinion and the rack 31 are brought into mesh engagement with each other. When the pinion is rotationally driven by the stepping motor, the color measuring unit 3 is moved along the rack 31 in the main scanning direction.

The imaging unit 5 is a device which is connected to the control processing unit 6 and is capable of taking an optical image of an object, according to control of the control processing unit 6. The imaging unit 5 is constructed, for example, such that it includes a line sensor (linear image sensor) having a plurality of photoelectric conversion elements arranged along one direction. As depicted in FIG. 3, it is disposed to extend, along the main scanning direction (x direction), i.e., in a state in which the one direction as an arrangement direction of the plurality of photoelectric conversion elements is coincident with the main scanning direction (x direction).

As depicted in FIG. 2, the imaging unit 5 is disposed between the first sheet conveyance roller assembly 20-1 and the second sheet conveyance roller assembly 20-2, and the color measuring unit 3 and the main-scanning-directionally moving unit 4 are disposed to allow the color measuring unit 3 to be moved between the second sheet conveyance roller assembly 20-2 and the third sheet conveyance roller assembly 20-3, along the main scanning direction. The imaging unit 5 is operable to image a measurement target sheet with respect to each line along the main scanning direction (x direction), in a state in which the measurement target sheet is being conveyed in the sub scanning direction (y direction) by the sub-scanning-directionally moving unit 2, to thereby generate an image (image data) of the measurement target sheet. A relative position y between a measurement target sheet and the color measuring unit 3 in the sub scanning direction can be changed by conveying the measurement target sheet in the sub scanning direction (y direction) by the sub-scanning-directionally moving unit 2, and a relative position x between the measurement target sheet and the color measuring unit 3 in the main scanning direction can be changed by moving the color measuring unit 3 itself in the main scanning direction (x direction) by the main-scanning-directionally moving unit 4. In this way, the color measuring unit 3 can be moved to an arbitrary position (x, y) on the measurement target sheet to measure a color at the position (x, y).

The input unit 7 is a device which is connected to the control processing unit 6 and is capable of allowing various commands such as a command directing a color measurement of a measurement target, and various data, such as an identifier of a measurement target, necessary for a color measurement, to be input into the color measurement device CM therethrough. For example, it may be a plurality of input switches each assigned with a given function. The output unit 8 is a device which is connected to the control processing unit 6 and is operable, according to control of the control processing unit 6, to output the command and data input through the input unit 7, and a color of a measurement target measured by the color measurement device CM. For example, it may be a display unit such as a CRT display, an LCD or an organic EL display, or a printing unit such as printer.

The input unit 7 and the output unit 8 may be constructed as a touch panel. In the case of constructing such a touch panel, the input unit 7 is a position input unit, such as a resistive type or a capacitive type, operable to detect and accept an operated position, and the output unit 8 is be a display unit. In this touch panel, the position input unit is provided on a display surface of the display unit. When one or more candidates for input content inputtable into the display unit are displayed on the display unit, and a user touches a position of the display surface at which an input content the user wants to input is displayed, the touched position is detected by the position input unit, and the content displayed at the detected position is input into the color measurement device CM, as an input content operated by the user. Such a touch panel allows a user to intuitively understand an input operation, so that it is possible to provide a color measurement device CM which is easy to handle for a user.

The IF unit 9 is a circuit which is connected to the control processing unit 6 and is operable, according to control of the control processing unit 6, to perform input and output of data with respect to an external device. For example, it is may be: an interface circuit conforming to the serial communication standard RS-232C; an interface circuit conforming to the Bluetooth (trademark) standard; an interface circuit for infrared communication conforming to the IrDA (Infrared Data Association) standard or the like; and an interface circuit conforming to the USB (Universal Serial Bus) standard.

The storage unit 10 is a circuit which is connected to the control processing unit 6 and is operable, according to control of the control processing unit 6, to store therein various given programs and various given data. Examples of the various given programs include a control processing program such as a color measurement program for measuring a color of a measurement target, and a positional deviation correction program for, in the case where the measurement target is a color chart CT, correcting a positional deviation of the color chart CT. For example, the storage unit 10 includes: an ROM (Read Only Memory) as a non-volatile storage element, and an EEPROM (Electrically Erasable Programmable Read Only Memory) as a rewritable non-volatile storage element. The storage unit 10 also includes an RAM (Random Access Memory) capable of storing data or the like generated during execution of the given program to serve as a so-called "working memory" for the control processing unit 6.

The control processing unit 6 is a circuit which respectively controls the units of the color measurement device CM depending on the functions of the units to derive a color of a measurement target. The control processing unit 6 is constructed, for example, such that it comprises a CPU (Central Processing Unit) and its peripheral circuit. During execution of the control processing program, a control section 61, a positional deviation processing section 62 and a color measurement processing section 63 are functionally formed in the control processing unit 6.

The control section 61 respectively controls the units of the color measurement device CM depending on the functions of the units.

The positional deviation processing section 62 acquires an entire image of the color chart CT by causing the imaging unit 5 to image the color chart CT while causing the sub-scanning-directionally moving unit (sheet feeding unit) 2 to convey the color chart CT in the forward feeding; acquires a partial image of the color chart CT by causing the imaging unit 5 to image the color chart CT while causing the sub-scanning-directionally moving unit 2 to convey the color chart CT in the backward feeding; and, based on the acquired entire and partial images of the color chart CT; and derives an amount of positional deviation of the color chart CT occurring between the forward feeding and the backward feeding.

Accurately, "an amount of positional deviation between the entire image and the partial image" means an amount of positional deviation between an image obtained by extracting a partial region of the entire image corresponding to the partial image, and the partial image. Thus, although, for the sake of simplification, the term "entire image" is used in connection with the positional deviation detection in the following description, it means a part of the entire image, more specifically, a partial region of the entire image corresponding to the partial image.

More specifically, the positional deviation processing section functionally includes a feature extraction processing subsection 621 and a positional deviation amount calculation processing subsection 622. The feature extraction processing subsection 621 generates entire image-based extracted feature information and partial image-based extracted feature information each of which is a given feature extracted from a respective one of the entire image and the partial image. The positional deviation amount calculation processing subsection 622 derives the amount of positional deviation of the color chart CT, based on the entire image-based extracted feature information and the partial image-based extracted feature information generated by the feature extraction processing subsection 621. In one or more embodiments, the positional deviation amount calculation processing subsection 622 is operable to derive the amount of positional deviation of the color chart CT, by a cross-correlation operation based on the entire image-based extracted feature information and the partial image-based extracted feature information generated by the feature extraction processing subsection 621.

The entire image-based extracted feature information is one selected from the group consisting of entire image data which is image data of the entire image itself, entire image-based binarized edge image data, entire image-based edge line image data, entire image-based binarized edge projection graph data, and entire image-based edge line projection graph data. When the entire image-based extracted feature information is the entire image-based binarized edge image data, the feature extraction processing subsection 621 is operable to subject the entire image to binarization processing, using an edge filter for use in detecting an edge extending in one direction in an image, to thereby generate the entire image-based binarized edge image data. When the entire image-based extracted feature information is the entire image-based edge line image data, the feature extraction processing subsection 621 is operable to subject the entire image to the binarization processing, using the edge filter for use in detecting an edge extending in one direction in an image, to thereby generate the entire image-based binarized edge image data, and further subject the generated entire image-based edge line image data to a Hough transform to thereby generate the entire image-based edge line image data. When the entire image-based extracted feature information is the entire image-based binarized edge projection graph data, the feature extraction processing subsection 621 is operable to subject the entire image to the binarization processing, using the edge filter for use in detecting an edge extending in one direction in an image, to thereby generate the entire image-based binarized edge image data, and further integrate and project pixel values of a plurality of pixels in the generated entire image-based binarized edge image data, along the one direction to thereby generate the entire image-based binarized edge projection graph data. When the entire image-based extracted feature information is the entire image-based edge line projection graph data, the feature extraction processing subsection 621 is operable to subject the entire image to the binarization processing, using the edge filter for use in detecting an edge extending in one direction in an image, to thereby generate the entire image-based binarized edge image data, and, after further subjecting the generated entire image-based binarized edge image data to a Hough transform to thereby generate the entire image-based edge line image data, further integrate and project pixel values of a plurality of pixels in the generated entire image-based edge line image data, along the one direction to thereby generate the entire image-based edge line projection graph data.

The partial image-based extracted feature information is one selected from the group consisting of partial image data which is image data of the partial image itself, partial image-based binarized edge image data, partial image-based edge line image data, partial image-based binarized edge projection graph data, and partial image-based edge line projection graph data. When the partial image-based extracted feature information is the partial image-based binarized edge image data, the feature extraction processing subsection 621 is operable to subject the partial image to binarization processing, using an edge filter for use in detecting an edge extending in one direction in an image, to thereby generate the partial image-based binarized edge image data. When the partial image-based extracted feature information is the partial image-based edge line image data, the feature extraction processing subsection 621 is operable to subject the partial image to the binarization processing, using the edge filter for use in detecting an edge extending in one direction in an image, to thereby generate the partial image-based binarized edge image data, and further subject the generated partial image-based binarized edge image data to a Hough transform to thereby generate the partial image-based edge line image dat. When the partial image-based extracted feature information is the partial image-based binarized edge projection graph data, the feature extraction processing subsection 621 is operable to subject the partial image to the binarization processing, using the edge filter for use in detecting an edge extending in one direction in an image, to thereby generate the partial image-based binarized edge image data, and further integrate and project pixel values of a plurality of pixels in the generated partial image-based binarized edge image data, along the one direction to thereby generate the partial image-based binarized edge projection graph data. When the partial image-based extracted feature information is the partial image-based edge line projection graph data, the feature extraction processing subsection 621 is operable to subject the partial image to the binarization processing, using the edge filter for use in detecting an edge extending in one direction in an image, to thereby generate the partial image-based binarized edge image data, and, after further subjecting the generated partial image-based binarized edge image data to a Hough transform to thereby generate the partial image-based edge line image data, further integrate and project pixel values of a plurality of pixels in the generated partial image-based edge line image data, along the one direction to thereby generate the partial image-based edge line projection graph data.

For example, as this feature extraction processing sub-section 621, first to fifth types of feature extraction processing subsections 621A to 621E as depicted in FIG. 5 may be used.

As depicted in FIG. 5A, the first type of feature extraction processing subsection 621A is constructed such that it includes a binarized edge processing sub-subsection 6211 operable to subject an image to binarization processing, using an edge filter for use in detecting an edge extending in one direction in an image, to thereby generate binarized edge image data. In the first type of feature extraction processing subsection 621A, each of the entire image and the partial image can be processed by the binarized edge processing sub-subsection 6211, so as to generate a respective one of the entire image-based binarized edge image data and the partial image-based binarized edge image data.

As depicted in FIG. 5B, the second type of feature extraction processing subsection 621B is constructed such that it includes the binarized edge processing sub-subsection 6211 as mentioned above, and a Hough transform processing sub-subsection 6212 operable to subject the binarized edge image data generated by the binarized edge processing sub-subsection 6211, to a Hough transform to thereby generate edge line image data. In the second type of feature extraction processing subsection 621B, each of the entire image and the partial image can be processed by the binarized edge processing sub-subsection 6211, so as to generate a respective one of the entire image-based binarized edge image data and the partial image-based binarized edge image data, and further each of the entire image-based binarized edge image data and the partial image-based binarized edge image data can be processed by the Hough transform processing sub-subsection 6212, so as to generate a respective one of the entire image-based edge line image data and the partial image-based edge line image data.

As depicted in FIG. 5C, the third type of feature extraction processing subsection 621C is constructed such that it includes the binarized edge processing sub-subsection 6211 as mentioned above, and a binarized edge projection processing sub-subsection 6213 operable to integrate and project pixel values of a plurality of pixels in the binarized edge image data generated by the binarized edge processing sub-subsection 6211, along the one direction to thereby generate the binarized edge projection graph data. In the third type of feature extraction processing subsection 621C, the entire image and the partial image can be processed by the binarized edge processing sub-subsection 6211, and further resulting processing results can be processed by the binarized edge projection processing sub-subsection 6213, so as to generate the entire image-based binarized edge projection graph data and the partial image-based binarized edge projection graph data.

As depicted in FIG. 5D, the fourth type of feature extraction processing subsection 621D is constructed such that it includes: the binarized edge processing sub-subsection 6211 as mentioned above; the Hough transform processing sub-subsection 6212 as mentioned above; and an edge line projection processing sub-subsection 6214 operable to integrate and project pixel values of a plurality of pixels in the edge line image data generated by the Hough transform processing sub-subsection 6212, along the one direction to thereby generate the edge line projection graph data. In the fourth type of feature extraction processing subsection 621D, the entire image and the partial image can be processed by the binarized edge processing sub-subsection 6211, and further resulting processing results can be processed by the Hough transform processing sub-subsection 6212, whereafter resulting processing results can further be processed by the edge line projection processing sub-subsection 6214, so as to generate the entire image-based edge line projection graph data and the partial image-based edge line projection graph data.

As depicted in FIG. 5E, the fifth type of feature extraction processing subsection 621E includes the binarized edge processing sub-subsection 6211, the Hough transform processing sub-subsection 6212, the binarized edge projection processing sub-subsection 6213, and the edge line projection processing sub-subsection 6214, as mentioned above. In the fifth type of feature extraction processing subsection 621E, the entire image and the partial image can be processed by the binarized edge processing sub-subsection 6211, and further resulting processing results can be processed by the binarized edge projection processing sub-subsection 6213, so as to generate the entire image-based binarized edge projection graph data and the partial image-based binarized edge projection graph data. Further, in the fifth type of feature extraction processing subsection 621E, the entire image and the partial image can be processed by the binarized edge processing sub-subsection 6211, and further resulting processing results can be processed by the Hough transform processing sub-subsection 6212, whereafter resulting processing results can further be processed by the edge line projection processing sub-subsection 6214, so as to generate the entire image-based edge line projection graph data and the partial image-based edge line projection graph data.

Meanwhile, in the cross-correlation operation, only a plurality of data from the same spatial region can be calculated. That is, a plurality of data from different spatial regions can be calculated. In one or more embodiments, the amount of positional deviation of the color chart CT is derived by the cross-correlation operation based on the entire image-based extracted feature information and the partial image-based extracted feature information. Thus, in one or more embodiments, the types of entire image-based extracted feature information and the types of partial image-based extracted feature information can be combined as follows.

A first combination is a set of the entire image data which is image data of the entire image itself, as the entire image-based extracted feature information, and the partial image data which is image data of the partial image itself, as the partial image-based extracted feature information.

A second combination is a set of the entire image-based binarized edge image data as the entire image-based extracted feature information, and one of the partial image-based binarized edge image data and the partial image-based edge line image data as the partial image-based extracted feature information.

A third combination is a set of the entire image-based edge line image data as the entire image-based extracted feature information, and one of the partial image-based binarized edge image data and the partial image-based edge line image data as the partial image-based extracted feature information.

A fourth combination is a set of the entire image-based binarized edge projection graph data as the entire image-based extracted feature information, and one of the partial image-based binarized edge projection graph data and the partial image-based edge line projection graph data as the partial image-based extracted feature information.

A fifth combination is a set of the entire image-based edge line projection graph data as the entire image-based extracted feature information, and one of the partial image-based binarized edge projection graph data and the partial image-based edge line projection graph data as the partial image-based extracted feature information.

The color measurement processing section 63 causes the color measuring unit 3 to measure the color of each of the plurality of patches, while correcting a measurement position at which the color measuring unit 3 performs the color measurement, according to the amount of positional deviation of the color chart CT derived by the positional deviation processing section 62.

Figure 6:
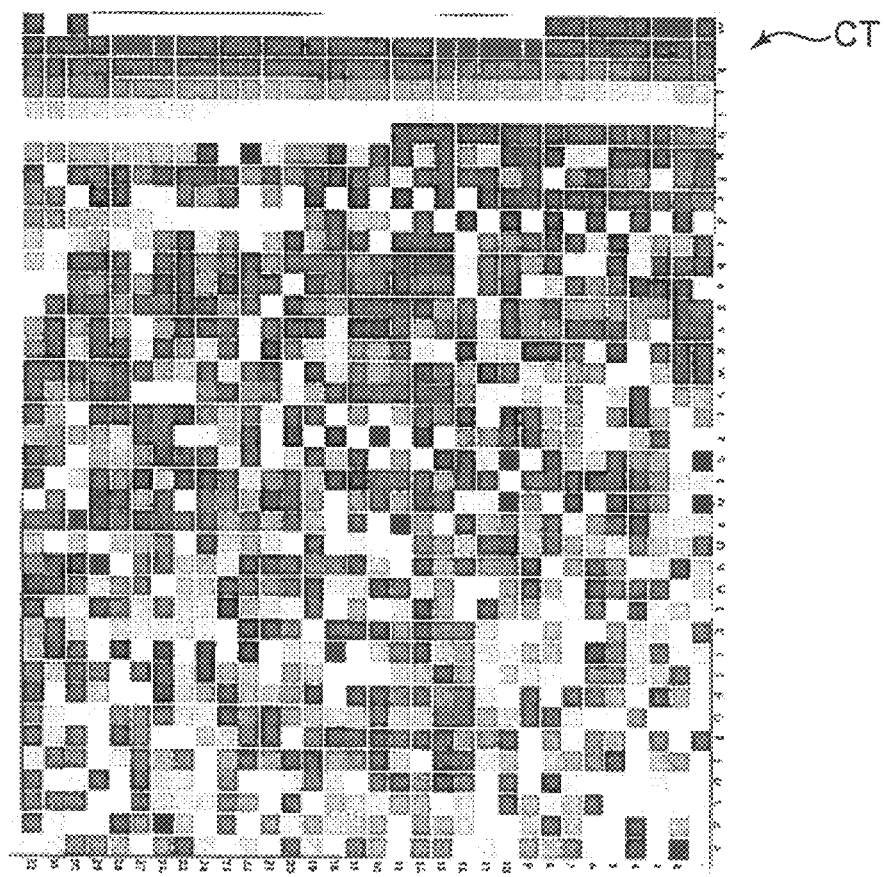
FIG. 6 is a diagram depicting, as one example, an entire image of a color chart.
Figure 7:
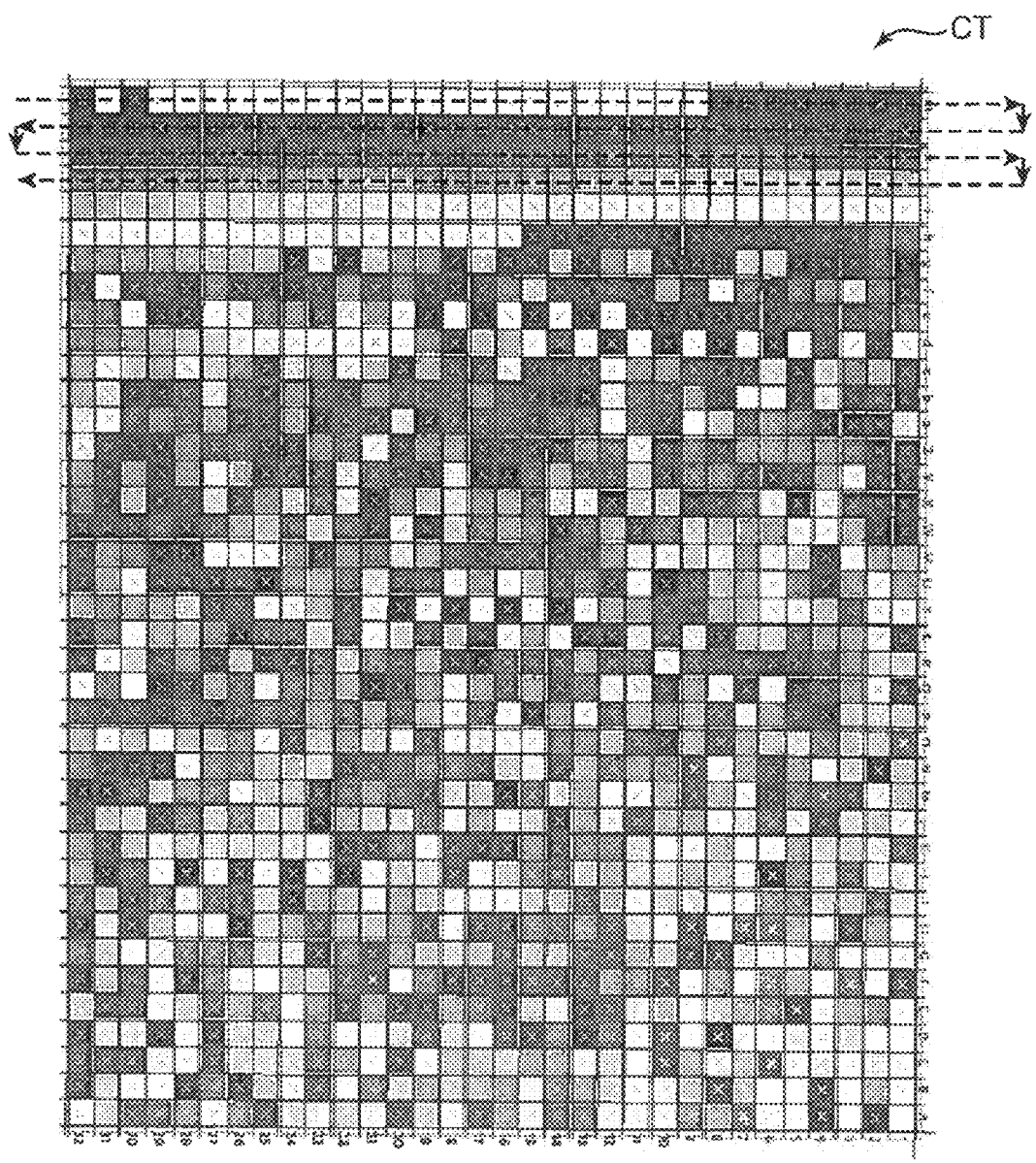
FIG. 7 is a diagram depicting an actual measured position (x) of each patch of the color chart in FIG. 6.
Figure 8:
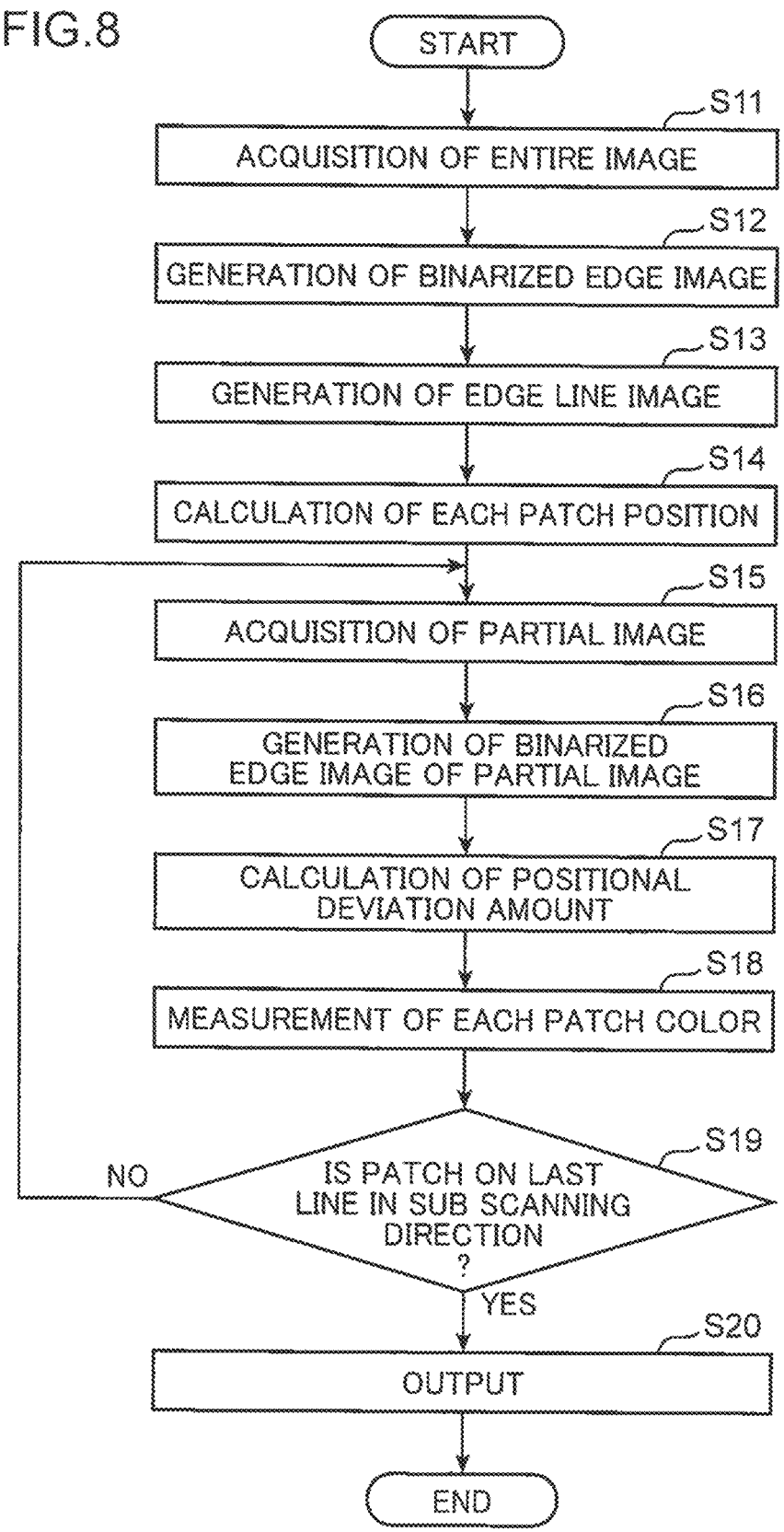
FIG. 8 is a flowchart depicting an operation of the color measurement device in accordance with one or more embodiments.
Figure 9:
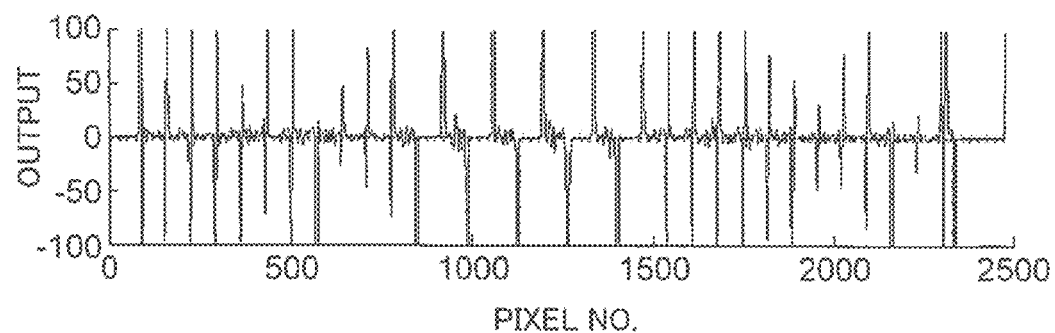
FIG. 9 is a chart depicting one example of a result of processing for the color chart in FIG. 6, wherein an image at a certain y-directional position was subjected to processing using a difference filter having a number N of difference interval points along a horizontal direction.
Figure 10:
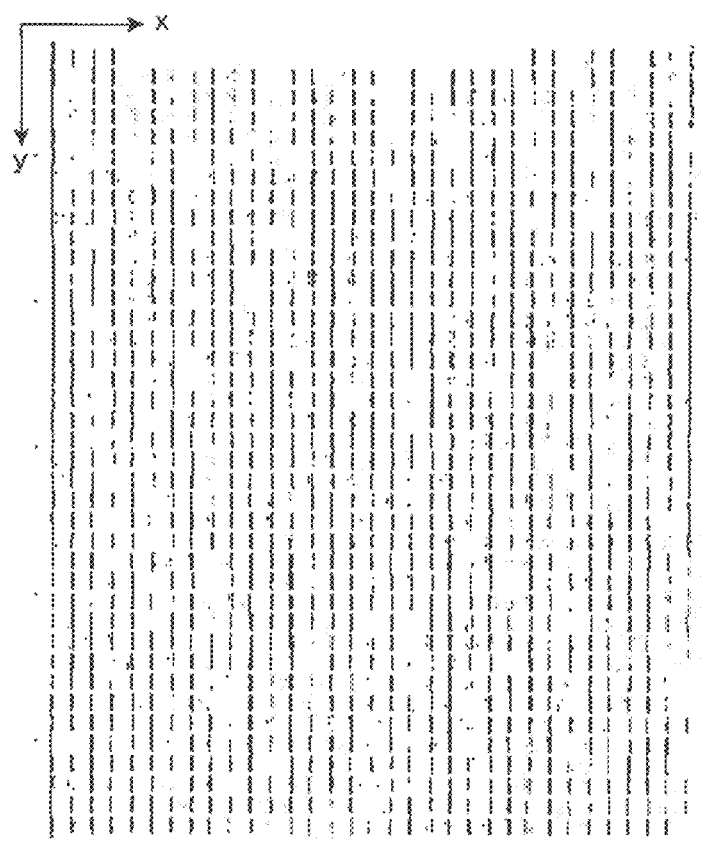
FIG. 10 is a diagram depicting, as one example, an entire image-based binarized vertical edge image of the color chart in FIG. 6.
Figure 11:
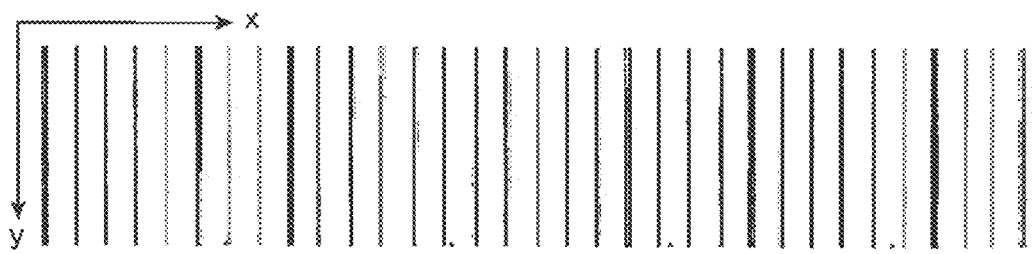
FIG. 11 is a diagram depicting, as one example, a part of the entire image-based vertical edge line image of the color chart in FIG. 6.
Figure 12:
FIG. 12 is a diagram depicting, as one example, an entire image-based binarized horizontal edge image of the color chart in FIG. 6.
Figure 13:
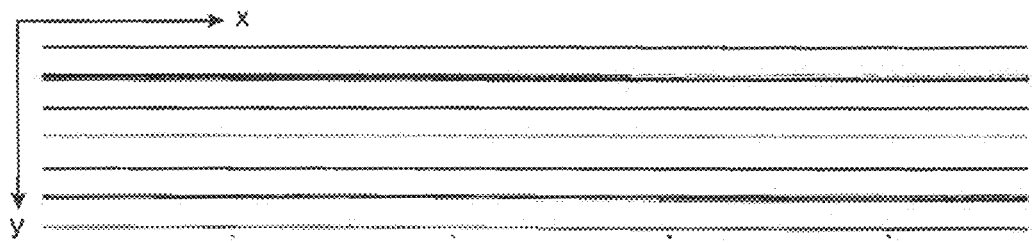
FIG. 13 is a diagram depicting, as one example, a part of the entire image-based horizontal edge line image of the color chart in FIG. 6.
Figure 14:
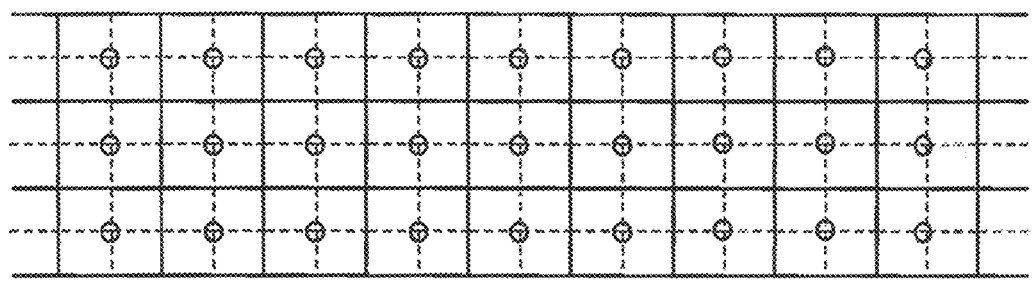
FIG. 14 is a diagram depicting, as one example, a part of positions of a plurality of patches derived from the entire image-based vertical edge line image and the entire image-based horizontal edge line image of the color chart in FIG. 6.
Figure 15:
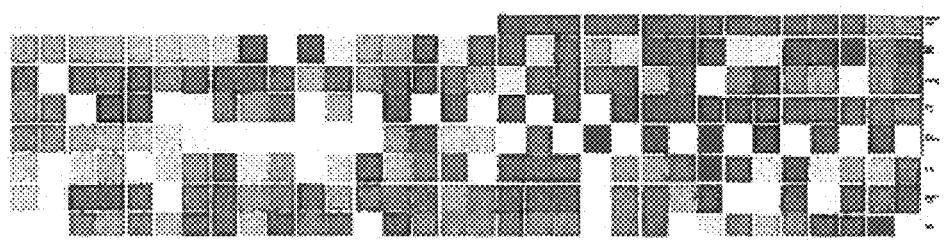
FIG. 15 is a diagram depicting, as one example, a partial image of the color chart in FIG. 6.
Figure 16:
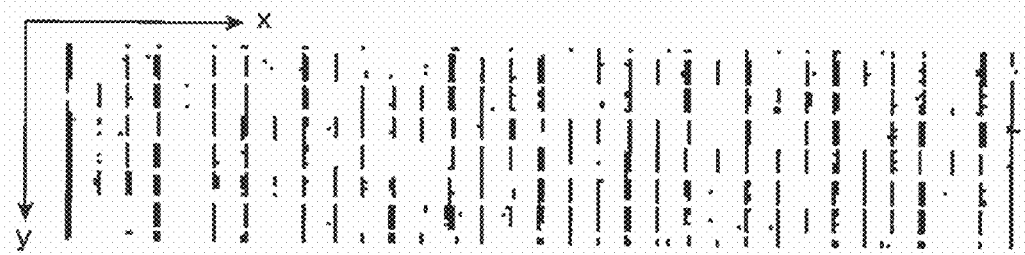
FIG. 16 is a diagram depicting, as one example, a partial image-based binarized vertical edge image of the color chart in FIG. 15.
Figure 17:
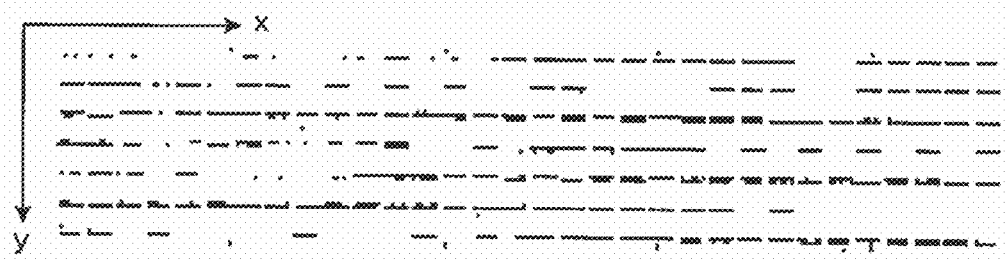
FIG. 17 is a diagram depicting, as one example, a partial image-based binarized horizontal edge image of the color chart in FIG. 15.
Figure 18:
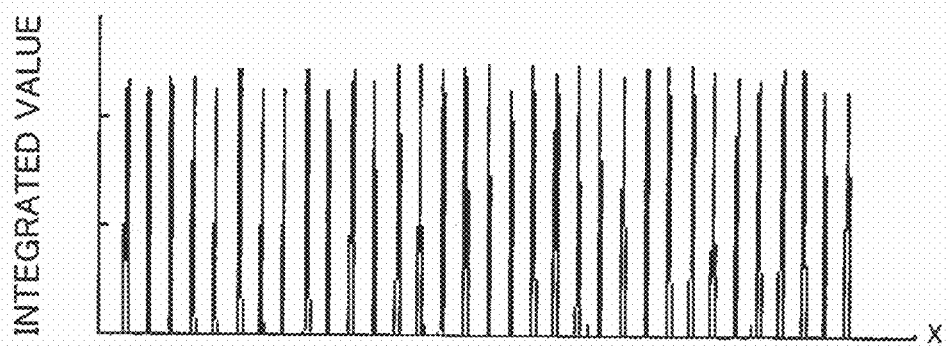
FIG. 18 is a chart depicting, as one example, a part of an entire image-based vertical edge line projection graph of the color chart in FIG. 6.
Figure 19:
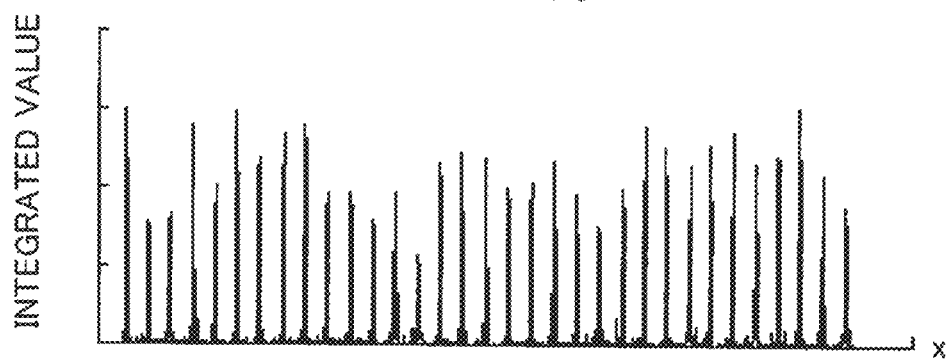
FIG. 19 is a chart depicting, as one example, a partial image-based vertical edge line projection graph of the color chart in FIG. 15.
Figure 20:
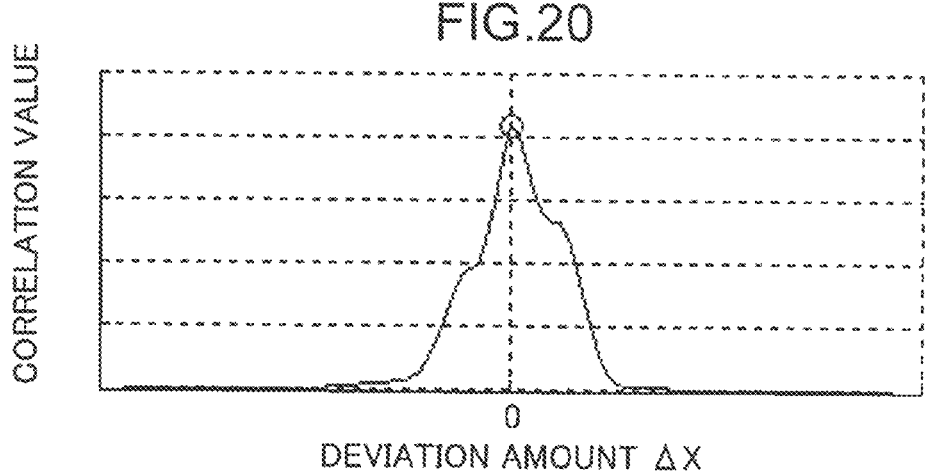
FIG. 20 is a chart depicting, as one example, a result of processing on cross-correlation between the entire image-based vertical edge line projection graph in FIG. 18 and the partial image-based vertical edge line projection graph in FIG. 19 (positional deviation amount).
Figure 21:
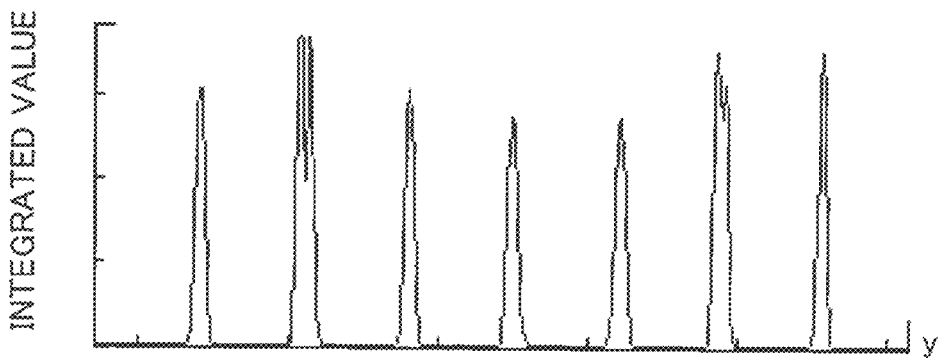
FIG. 21 is a chart depicting, as one example, a part of an entire image-based horizontal edge line projection graph of the color chart in FIG. 6.
Figure 22:
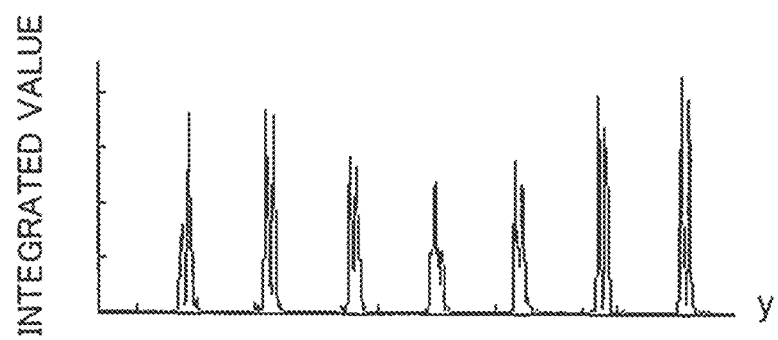
FIG. 22 is a chart depicting, as one example, a partial image-based horizontal edge line projection graph of the color chart in FIG. 15.
Figure 23:
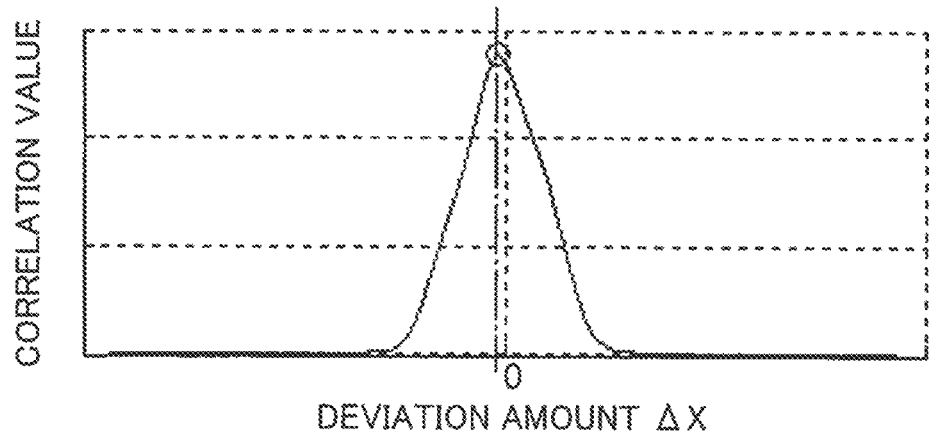
FIG. 23 is a chart depicting, as one example, a result of processing on cross-correlation between the entire image-based horizontal edge line projection graph in FIG. 21 and the partial image-based horizontal edge line projection graph in FIG. 22 (positional deviation amount).

Next, an operation of the color measurement device in accordance with one or more embodiments will be described. FIG. 6 is a diagram depicting, as one example, an entire image of a color chart. FIG. 7 is a diagram depicting an actual measured position (x) of each patch of the color chart in FIG. 6. FIG. 8 is a flowchart depicting an operation of the color measurement device in accordance with one or more embodiments. FIG. 9 is a chart depicting one example of a result of processing for the color chart in FIG. 6, wherein an image at a certain y-directional position was subjected to processing using a difference filter having a number N of difference interval points along a horizontal direction. In FIG. 9, the vertical axis represents a pixel number (i.e., position in the horizontal direction x), and the vertical axis represents a difference value. FIG. 10 is a diagram depicting, as one example, an entire image-based binarized vertical edge image of the color chart in FIG. 6. FIG. 11 is a diagram depicting, as one example, a part of the entire image-based vertical edge line image of the color chart in FIG. 6. FIG. 12 is a diagram depicting, as one example, an entire image-based binarized horizontal edge image of the color chart in FIG. 6. FIG. 13 is a diagram depicting, as one example, a part of the entire image-based horizontal edge line image of the color chart in FIG. 6. FIG. 14 is a diagram depicting, as one example, a part of positions of a plurality of patches derived from the entire image-based vertical edge line image and the entire image-based horizontal edge line image of the color chart in FIG. 6. In FIG. 14, the solid line and the broken line denote, respectively, a vertical edge line or a horizontal edge line, and an intermediate line between adjacent vertical edge lines or an intermediate line between adjacent horizontal edge lines, and o denotes an actually measured position of each patch (actual measured patch position). FIG. 15 is a diagram depicting, as one example, a partial image of the color chart in FIG. 6. FIG. 16 is a diagram depicting, as one example, a partial image-based binarized vertical edge image of the color chart in FIG. 15. FIG. 17 is a diagram depicting, as one example, a partial image-based binarized horizontal edge image of the color chart in FIG. 15. FIG. 18 is a chart depicting, as one example, a part of an entire image-based vertical edge line projection graph of the color chart in FIG. 6. FIG. 19 is a chart depicting, as one example, a partial image-based vertical edge line projection graph of the color chart in FIG. 15. In each of FIGS. 18 and 19, the horizontal axis represents the x axis along the horizontal direction (main scanning direction), and the vertical axis represents an integrated value. FIG. 20 is a chart depicting, as one example, a result of processing on cross-correlation between the entire image-based vertical edge line projection graph in FIG. 18 and the partial image-based vertical edge line projection graph in FIG. 19 (positional deviation amount). In FIG. 20, the horizontal axis represents a deviation amount $\Delta x$, and the vertical axis represents a cross-correlation value. FIG. 21 is a chart depicting, as one example, a part of an entire image-based horizontal edge line projection graph of the color chart in FIG. 6. FIG. 22 is a chart depicting, as one example, a partial image-based horizontal edge line projection graph of the color chart in FIG. 15. In each of FIGS. 21 and 22, the horizontal axis represents the y axis along the vertical direction (sub scanning direction), and the vertical axis represents an integrated value. FIG. 23 is a chart depicting, as one example, a result of processing on cross-correlation between the entire image-based horizontal edge line projection graph in FIG. 21 and the partial image-based horizontal edge line projection graph in FIG. 22 (positional deviation amount). In FIG. 23, the horizontal axis represents a deviation amount $\Delta y$, and the vertical axis represents a cross-correlation value.

In the above color measurement device CM, the imaging unit 5 images the color chart CT with respect to each line along the main scanning direction (x direction), in a state in which the color chart CT is being conveyed along the sub scanning direction (y direction) in the forward feeding by the sub-scanning-directionally moving unit 2, to thereby generate an entire image of the color chart CT. This entire image of the color chart CT is subjected to an edge binarization processing for extracting and binarizing an edge component of the entire image in the main scanning direction (x direction, horizontal direction) and the sub scanning direction (y direction, vertical direction), and an image obtained by the processing is subjected to a Hough transform. As a result, a plurality of edge lines along the main scanning direction (x direction, horizontal direction) and a plurality of edge lines along the sub scanning direction (y direction, vertical direction) are obtained. Then, an intersection of an intermediate line between adjacent ones of the edge lines along the main scanning direction and an intermediate line between adjacent ones of the edge lines along the sub scanning direction is derived as a position (x, y) of each patch. For example, the color chart CT depicted in FIG. 6, formed such that a plurality of quadrangular-shaped patches having various colors are arranged in horizontal and vertical directions (two directions (the x and y directions) orthogonal to each other) in a two-dimensional array configuration, may be subjected to the above processing. In this case, it is possible to derive the position (x, y) of each patch, for example, as indicated by the mark "x" in FIG. 7. Then, the main-scanning-directionally moving unit 4 moves the color measuring unit 3 itself along the main scanning direction (x direction), in the state in which the color chart CT is being conveyed along the sub scanning direction (y direction) in the backward feeding by the sub-scanning-directionally moving unit 2, so that the color measuring unit 3 can be moved to each patch position (x, y) derived in the above manner, to measure a color of each patch. In this process, a position (x, y) of each patch is derived from the color chart CT during forward feeding by the sub-scanning-directionally moving unit 2, and the color measuring unit 3 is moved, by the main-scanning-directionally moving unit 4, to each patch position (x, y) actually measured during the forward feeding, in the state in which the color chart CT is being conveyed in the backward feeding by the sub-scanning-directionally moving unit 2, so as to perform color measurement of each patch. Thus, when the color measuring unit 3 is moved to each patch position (x, y) actually measured in the above manner, a positional deviation ($\Delta x$, $\Delta y$) is likely to occur, for example, due to influences of slipping of the sheet, backlash and others. For this reason, in order to correct the positional deviation (Δx, Δy), the color measurement device CM in accordance with one or more embodiments is constructed to operate as follows. The positional deviation Δx is an amount of deviation between an actually measured patch position and a position of the color measuring unit 3 moved without any correction as described later, in the main scanning direction (x direction), and the positional deviation Δy is an amount of deviation between an actually measured patch position and a position of the color measuring unit 3 moved without any correction as described later, in the sub scanning direction (y direction).

In FIG. 8, when a color chart CT is set in the sheet feeding unit 1, and a start of color measurement is directed through the input unit 7, the color measurement device CM first acquires an entire image of the color chart CT during the forward feeding (S11). More specifically, the positional deviation processing section 62 of the control processing unit 6 operates to acquire the entire image of the color chart CT by causing the sub-scanning-directionally moving unit 2 to convey the color chart CT from one edge to the other edge of a predetermined patch region of the color chart CT along the sub scanning direction (y direction) in the forward feeding, using a heretofore-known commonplace means, and causing the imaging unit 5 to image, in synchronization with this conveyance along the sub scanning direction, the color chart CT with respect to each line along the main scanning direction (x direction). The patch region means a region of the color chart CT in which the plurality of patches are located. For example, the entire image of the color chart CT depicted in FIG. 6 is acquired.

Subsequently, the color measurement device CM extracts and binarizes an edge component of the entire image of the color chart CT acquired in the processing S11 using a given edge filter, to thereby generate image data of a binarized edge image (binarized edge image data) (S12). More specifically, the binarized edge processing sub-subsection 6211 in the feature extraction processing subsection 621 of the positional deviation processing section 62 operates to, based on the entire image of the color chart CT, generate image data of an binarized vertical edge component of the entire image obtained by expressing, as binary values, an edge component of the entire image along the vertical direction (y direction) (entire image-based binarized vertical edge image data), and image data of an binarized horizontal edge component of the entire image obtained by expressing, as binary values, an edge component of the entire image along the horizontal direction (x direction) (entire image-based binarized horizontal edge image data).

In the case of deriving a vertical edge component as an edge component along the sub scanning direction (vertical direction, y direction), it is possible to use, as an example of the edge filter, a difference filter expressed in the following formula (1) which has a number N of difference interval points and is capable of providing a difference output in the main scanning direction (horizontal direction, x direction).

$$DiffFilterX = [\underbrace{1 \quad 0 \quad \ldots \quad 0 \quad -1}_{(N-1) \, POINT}] \quad (1)$$

An inward region of each patch has the same color and almost no change in color density. On the other hand, a boundary (edge) between adjacent ones of the patches has a large change in color density. Thus, the inward region of each patch has a relatively small difference value, and the patch boundary (edge) has a relatively large difference value. FIG. 9 depicts one example of a result of processing for the color chart in FIG. 6, wherein an image at a certain y-directional position was subjected to processing using a difference filter having a number N of difference interval points along the x direction.

Then, an absolute value of the processing result after the edge filter processing is derived and compared with a preliminarily set threshold th1. As a result of this comparison, when the absolute is equal to or greater than threshold th1, it is set to 1. On the other hand, when the absolute is less than threshold th1, it is set to 0. In this way, respective pixel values of a plurality of pixels are binarized to generate binarized vertical edge image data. It is to be understood that, after the binarization, noise may further be removed to generate the binarized vertical edge image data.

On the other hand, in the case of deriving a horizontal edge component as an edge component along the main scanning direction (horizontal direction, x direction), it is possible to use, as an example of the edge filter, a difference filter expressed in the following formula (2) which has a number N of difference interval points and is capable of providing a difference output in the sub scanning direction (vertical direction, y direction), in place of the formula (1).

$$DiffFilterY = \left. \begin{bmatrix} 1 \\ 0 \\ \vdots \\ 0 \\ -1 \end{bmatrix} \right\} (N-1)_{POINT} \quad (2)$$

Then, the difference output is processed in the same manner as that in the generation of the binarized vertical edge image data, to generate binarized horizontal edge image data.

For example, an edge component of the entire image of the color chart CT in FIG. 6 may be extracted by using the edge filter expressed by the formula (1), and then binarized. In this case, it is possible to generate entire image-based binarized vertical edge image data pictVer0 (x, y) (e.g., image data of an entire image-based binarized vertical edge image depicted in FIG. 10). Further, an edge component of the entire image of the color chart CT in FIG. 6 may be extracted by using the edge filter expressed by the formula (2), and then binarized. In this case, it is possible to entire image-based binarized horizontal edge image data pictHor0 (x, y) (e.g. image data of an entire image-based binarized horizontal edge image depicted in FIG. 12).

Subsequently, the color measurement device CM subjects the binarized edge image data about the color chart CT, generated in the processing S12, to so-called "straight line detection" based on a Hough transform, to thereby detect edge lines to generate an edge line image (S13). More specifically, the Hough transform processing sub-subsection 6212 in the feature extraction processing subsection 621 of the positional deviation processing section 62 operates to Hough-transform each of the entire image-based binarized vertical edge image data and the entire image-based binarized horizontal edge image data about the color chart CT, to thereby generate a respective one of entire image-based vertical edge line image data and entire image-based horizontal edge line image data.

For example, when the entire image-based binarized vertical edge image data pictVer0 (x, y) (image data of the entire image-based binarized vertical edge image of the color chart CT, depicted in FIG. 10) is Hough-transformed, entire image-based vertical edge line image data pictHoughVer0 (x, y) in an entire image-based vertical edge line image as depicted, for example, in FIG. 11, is generated. Further, when the entire image-based binarized horizontal edge image data pictHor0 (x, y) (image data of the entire image-based binarized horizontal edge image of the color chart CT, depicted in FIG. 12) is Hough-transformed, entire image-based horizontal edge line image data pictHoughHor0 (x, y) in an entire image-based horizontal edge line image as depicted, for example, in FIG. 13, is generated.

Subsequently, the color measurement device CM derives a position (x, y) of each patch based on the edge line image data generated in the processing S13 (S14). More specifically, first of all, the positional deviation processing section 62 operates to, based on the entire image-based vertical edge line image data, derive a vertical intermediate line which is an intermediate line between adjacent ones of a plurality of vertical edge lines. Then, the positional deviation processing section 62 operates to, based on the entire image-based horizontal edge line image data, derive a horizontal intermediate line which is an intermediate line between adjacent ones of a plurality of horizontal edge lines. Then, the positional deviation processing section 62 operates to derive respective intersections of a plurality of the derived vertical intermediate lines and a plurality of the derived horizontal intermediate lines, as respective positions (x, y) of the patches.

For example, when the vertical intermediate lines and the horizontal intermediate lines are derived, respectively, based on the entire image-based vertical edge line image data and the entire image-based horizontal edge line image data derived with respect to the color chart CT in FIG. 6, vertical intermediate lines and horizontal intermediate lines indicated by the broken lines in FIG. 14 are derived, and respective intersections of the vertical intermediate lines and the horizontal intermediate lines are derived as respective positions (x, y) of the patches, as indicated by the mark "○" in FIG. 14.

Subsequently, the color measurement device CM acquires a partial image of the color chart CT during the backward feeding (S15). More specifically, the positional deviation processing section 62 operates to acquire the partial image of the color chart CT by causing the sub-scanning-directionally moving unit 2 to convey the color chart CT from a certain position y1 to a certain position y2 along the sub scanning direction (y direction) in the backward feeding, and causing the imaging unit 5 to image, in synchronization with this conveyance along the sub scanning direction, the color chart CT with respect to each line along the main scanning direction (x direction). For example, with respect to the color chart CT depicted in FIG. 6, the partial image of the color chart CT depicted in FIG. 15 is acquired.

Subsequently, the color measurement device CM extracts and binarizes an edge component of the partial image of the color chart CT acquired in the processing S15 using a given edge filter, to thereby generate image data of a binarized edge image (binarized edge image data) (S16). More specifically, as with the processing of generating entire image-based binarized edge image, the binarized edge processing sub-subsection 6211 in the feature extraction processing subsection 621 of the positional deviation processing section 62 operates to, based on the partial image of the color chart CT, generate image data of an binarized vertical edge component of the partial image obtained by expressing, as binary values, an edge component of the partial image along the vertical direction (y direction) (partial image-based binarized vertical edge image data), and image data of an binarized horizontal edge component of the partial image obtained by expressing, as binary values, an edge component of the partial image along the horizontal direction (x direction) (partial image-based binarized horizontal edge image data).

For example, when an edge component of the partial image of the color chart CT depicted in FIG. 15, is extracted by using the edge filter expressed by the formula (1) and then binarized, partial image-based binarized vertical edge image data pictVer1 (x, y) (e.g., image data of a partial image-based binarized vertical edge image depicted in FIG. 16) is generated. For example, when an edge component of the partial image of the color chart CT depicted in FIG. 15 is extracted by using the edge filter expressed by the formula (2) and then binarized, partial image-based binarized horizontal edge image data pictHor1 (x, y) (e.g., image data of a partial image-based binarized horizontal edge image depicted in FIG. 17) is generated.

Subsequently, based on the entire image acquired in the processing S11 and the partial image acquired in the processing S15, the color measurement device CM drives an amount of positional deviation of the color chart CT occurring between the forward feeding and the backward feeding (S17). More specifically, first of all, the feature extraction processing subsection 621 of the positional deviation processing section 62 operates to generate entire image-based extracted feature information and partial image-based extracted feature information each of which is a given feature extracted from a respective one of the entire image acquired in the processing S11 and the partial image acquired in the processing S15. Then, the positional deviation amount calculation processing subsection 622 of the positional deviation processing section 62 operates to perform a cross-correlation operation based on the entire image-based extracted feature information and the partial image-based extracted feature information each generated by the feature extraction processing subsection 621, and derive the amount of positional deviation of the color chart CT from a result of the cross-correlation operation.

The positional deviation amount (Δx, Δy) of the color chart CT can be derived based on various combinations of two of the aforementioned types of entire image-based extracted feature information and the aforementioned types of partial image-based extracted feature information.

The following description will be made by taking, as one example, the case where the entire image-based extracted feature information is entire image-based edge line projection graph data, and the partial image-based extracted feature information is partial image-based binarized edge projection graph data.

A horizontal (x-directional) positional deviation amount Δx is derived in the following manner. First of all, the edge line projection processing sub-subsection 6214 of the feature extraction processing subsection 621 operates to integrate and project respective pixel values of a plurality of pixels along the y direction to thereby generate the entire image-based vertical edge line projection graph data. More specifically, the edge line projection processing sub-subsection 6214 operates to, in the entire image-based vertical edge line image data, integrate respective pixel values of all of a plurality of pixels having the same x-coordinate value and a y-coordinate value of y1 to y2, with respect to each x-coordinate value on the x axis. That is, the pixel values of the pixels are integrated along the y direction to derive an integrated value thereof. Then, the edge line projection processing sub-subsection 6214 operates to define the derived integrated value as a value for the x-coordinate value. In this way, the entire image-based vertical edge line projection graph data is generated. The above processing is performed in a region of the entire image corresponding to the partial image.

Then, the binarized edge projection processing sub-subsection 6213 of the feature extraction processing subsection 621 operates to integrate and project respective pixel values of a plurality of pixels along the y direction to thereby generate the partial image-based binarized vertical edge projection graph data. More specifically, the binarized edge projection processing sub-subsection 6213 operates to, in the partial image-based binarized vertical edge image data, integrate respective pixel values of all of a plurality of pixels having the same x-coordinate value and a y-coordinate value of y1 to y2, with respect to each x-coordinate value on the x axis. That is, the pixel values of the pixels are integrated along the y direction to derive an integrated value thereof. Then, the binarized edge projection processing sub-subsection 6213 operates to define the derived integrated value as a value for the x-coordinate value. In this way, the partial image-based binarized vertical edge projection graph data is generated.

Then, the positional deviation amount calculation processing subsection 622 operates to subject the entire image-based vertical edge line projection graph data and the partial image-based binarized vertical edge projection graph data to a cross-correlation operation to derive the horizontal (x-directional) positional deviation amount $\Delta x$ of the color chart CT.

For example, when the edge line projection processing sub-subsection 6214 operates to project the entire image-based vertical edge line image data pictHoughVer0 (x, y) (image data of the entire image-based vertical edge line image depicted in FIG. 11), using the following formula (3), entire image-based vertical edge line projection graph data vecHoughVer0 (x) (image data of an entire image-based vertical edge line projection graph depicted in FIG. 18) is generated. Further, when the binarized edge projection processing sub-subsection 6213 operates to project the partial image-based binarized vertical edge image data pictVer1 (x, y) (image data of the partial image-based binarized vertical edge image depicted in FIG. 16), using the following formula (4), partial image-based binarized vertical edge projection graph data vecVer1 (x) (data of a partial image-based binarized vertical edge projection graph depicted in FIG. 19) is generated. Then, the positional deviation amount calculation processing subsection 622 operates to calculate a cross-correlation $\phi$ ver (k) between the graph data vecHoughVer0 (x) and the graph data vecVer1 (x), using the following formula (5), to thereby obtain a result of the cross-correlation operation, as depicted in FIG. 20. In this cross-correlation operation result, a deviation amount providing the highest correlation value is derived as the horizontal (x-directional) positional deviation amount $\Delta x$ of the color chart CT.

$$vecHoughVer0(x) = \sum_{y=1}^{Ny} pictHoughVer0(x, y) \quad (3)$$

$$vecVer1(x) = \sum_{y=1}^{Ny} pictVer1(x, y) \quad (4)$$

$$\phi_{Ver}(k) = \sum_{i=1}^{Nx} (vecVer1(i-k) \cdot vecHoughVer0(i)) \quad (5)$$

$$(k = -SearchNum \sim +SearchNum)$$

On the other hand, a vertical (y-directional) positional deviation amount $\Delta y$ is derived in the following manner. First of all, the edge line projection processing sub-subsection 6214 of the feature extraction processing subsection 621 operates to integrate and project respective pixel values of a plurality of pixels along the x direction to thereby generate the entire image-based horizontal edge line projection graph data. More specifically, the edge line projection processing sub-subsection 6214 operates to, in the entire image-based horizontal edge line image data, integrate respective pixel values of all of a plurality of pixels having the same y-coordinate value, with respect to each y-coordinate value on the y axis. That is, the pixel values of the pixels are integrated along the x direction to derive an integrated value thereof. The above processing is performed in a region of the entire image corresponding to the partial image.

Then, the binarized edge projection processing sub-subsection 6213 of the feature extraction processing subsection 621 operates to integrate and project respective pixel values of a plurality of pixels along the x direction to thereby generate the partial image-based binarized horizontal edge projection graph data. More specifically, the binarized edge projection processing sub-subsection 6213 operates to, in the partial image-based binarized horizontal edge image data, integrate respective pixel values of all of a plurality of pixels having the same y-coordinate value, with respect to each y-coordinate value on the y axis. In this way, the pixel values of the pixels are integrated along the x direction to derive an integrated value thereof, and the partial image-based binarized horizontal edge projection graph data is generated.

Then, the positional deviation amount calculation processing subsection 622 operates to subject the entire image-based horizontal edge line projection graph data and the partial image-based binarized horizontal edge projection graph data to a cross-correlation operation to derive the vertical (y-directional) positional deviation amount $\Delta y$ of the color chart CT.

For example, when the edge line projection processing sub-subsection 6214 operates to project the entire image-based horizontal edge line image data pictHoughHor0 (x, y) (image data of the entire image-based horizontal edge line image depicted in FIG. 13), using the following formula (6), entire image-based horizontal edge line projection graph data vecHoughHor0 (y) (graph data of an entire image-based horizontal edge line projection graph depicted in FIG. 21) is generated. Further, when the binarized edge projection processing sub-subsection 6213 operates to project the partial image-based binarized horizontal edge image data pictHor1 (x, y) (image data of the partial image-based binarized horizontal edge image depicted in FIG. 17), using the following formula (7), partial image-based binarized horizontal edge projection graph data vecHor1 (y) (graph data of a partial image-based binarized horizontal edge projection graph depicted in FIG. 22) is generated. Then, the positional deviation amount calculation processing subsection 622 operates to calculate a cross-correlation $\phi$ hor (k) between graph data vecHoughHor0 (y) and graph data vecHor1 (y), using the following formula (8), to thereby obtain a result of the cross-correlation operation, as depicted in FIG. 23. In this cross-correlation operation result, a deviation amount providing the highest correlation value is derived as the vertical (y-directional) positional deviation amount $\Delta y$ of the color chart CT.

$$vecHoughHor0(y) = \sum_{x=1}^{Nx} pictHoughHor0(x, y) \quad (6)$$

-continued $$vecHor1(y) = \sum_{x=1}^{Nx} pictHor1(x, y) \quad (7)$$

$$\phi_{Hor}(k) = \sum_{i=1}^{Ny} (vecHor1(i-k) \cdot vecHoughHor0(i)) \quad (8)$$

$$(k = -SearchNum \sim +SearchNum)$$

Returning to FIG. 8, subsequently, in the color measurement device CM, the color measurement processing section 63 of the control processing unit 6 operates to cause the color measuring unit 3 to measure a color of each patch, while correcting each patch position (x, y) derived in the processing S14, by the positional deviation amount (Δx, Δy) of the color chart CT derived in the processing S17, and moving the color measuring unit 3 to each corrected patch position (x+Δx, y+Δy) (S18).

Subsequently, every time the color measurement for one patch has been completed, the color measurement device CM determines whether or not the patch is on the last line in the sub scanning direction (S19). As a result of this determination, when the patch is not on the last line (NO), the processing routine returns to the processing S15. That is, the processing of acquiring a partial image is performed again to add a newly acquired partial image, and the positional deviation amount of each patch on the next line is calculated.

On the other hand, as a result of the above determination, when the patch is on the last line (YES), the control section 61 of the control processing unit 6 operates to output respective colors of the patches measured in the processing S18, to the output unit 8 (S20), and terminate the processing routine. As needed, the control section 61 of the control processing unit 6 may be operable to output respective colors of the patches measured in the processing S18, to the IF unit 9.

Although the above embodiments have been descried based on an example where the entire image-based extracted feature information is the entire image-based edge line projection graph data vecHoughVer0 (x), vecHoughHor0 (y), and the partial image-based extracted feature information is the partial image-based binarized edge projection graph data vecVer1 (x), vecHor1 (y), they may be any other combination of two of the aforementioned types of entire image-based extracted feature information and the aforementioned types of partial image-based extracted feature information.

In one example, the entire image-based extracted feature information may be the entire image-based binarized edge projection graph data (entire image-based binarized vertical edge projection graph data vecVer0 (x) and entire image-based binarized horizontal edge projection graph data vecHor0 (y)), and the partial image-based extracted feature information may be the partial image-based binarized edge projection graph data (partial image-based binarized vertical edge projection graph data vecVer1 (x) and partial image-based binarized horizontal edge projection graph data vecHor1 (y)). In this case, the positional deviation amount (Δx, Δy) of the color chart CT can be derived using cross-correlations φ ver (k), φ hor (k) provided from the following formulas (9) and (10).

$$\phi_{Ver}(k) = \sum_{i=1}^{Nx} (vecVer1(i-k) \cdot vecVer0(i)) \quad (9)$$

$$\phi_{Hor}(k) = \sum_{i=1}^{Ny} (vecHor1(i-k) \cdot vecHor0(i)) \quad (10)$$

In another example, the entire image-based extracted feature information may be the entire image-based edge line image data (entire image-based vertical edge line image data pictHoughVer0 (x, y) and entire image-based horizontal edge line image data pictHoughHor0 (x, y)), and the partial image-based extracted feature information may be the partial image-based binarized edge image data (partial image-based binarized vertical edge image data pictVer1 (x, y) and partial image-based binarized horizontal edge image data pictHor1 (x, y)). In this case, the positional deviation amount (Δx, Δy) of the color chart CT can be derived using cross-correlations φ ver (k), φ hor (k) provided from the following formulas (11) and (12).

$$\phi_{Ver}(k) = \sum_{i=1}^{Nx} \sum_{j=1}^{Ny} (pictVer1(i-k, j) \cdot pictHoughVer0(i, j)) \quad (11)$$

$$\phi_{Hor}(k) = \sum_{i=1}^{Nx} \sum_{j=1}^{Ny} (pictHor1(i, j-k) \cdot pictHoughHor0(i, j)) \quad (12)$$

In yet another example, the entire image-based extracted feature information may be the entire image-based binarized edge image data (entire image-based binarized vertical edge image data pictVer0 (x, y) and entire image-based binarized horizontal edge image data pictHor0 (x, y)), and the partial image-based extracted feature information may be the partial image-based binarized edge image data (partial image-based binarized vertical edge image data pictVer1 (x, y) and partial image-based binarized horizontal edge image data pictHor1 (x, y)). In this case, the positional deviation amount (Δx, Δy) of the color chart CT can be derived using cross-correlations φ ver (k), φ hor (k) provided from the following formulas (13) and (14).

$$\phi_{Ver}(k) = \sum_{i=1}^{Nx} \sum_{j=1}^{Ny} (pictVer1(i-k, j) \cdot pictVer0(i, j)) \quad (13)$$

$$\phi_{Hor}(k) = \sum_{i=1}^{Nx} \sum_{j=1}^{Ny} (pictHor1(i, j-k) \cdot pictHor0(i, j)) \quad (14)$$

In still another example, the entire image-based extracted feature information may be image data pict0 (x, y) of the entire image itself, and the partial image-based extracted feature information may be image data pict1 (x, y) of the partial image itself. In this case, the positional deviation amount (Δx, Δy) of the color chart CT can be derived using cross-correlations φ ver (k), φ hor (k) provided from the following formulas (15) and (16).

$$\phi(k) = \sum_{i=1}^{Nx} \sum_{j=1}^{Ny} (pict1(i-k, j) \cdot pict0(i, j)) \quad (15)$$

$$\phi(k) = \sum_{i=1}^{Nx} \sum_{j=1}^{Ny} (pict1(i, j-k) \cdot pict0(i, j)) \quad (16)$$

In the case of any other combination, the positional deviation amount (Δx, Δy) of the color chart CT can be derived using cross-correlations ϕ ver (k), ϕ hor (k) provided from similar formulas to the above.

As mentioned above, in the color measurement device CM in accordance with one or more embodiments and a color measurement method employed therein, an entire image and a partial image of the color chart CT are acquired, respectively, during conveyance of the color chart CT in the forward feeding by the sub-scanning-directionally moving unit (sheet feeding unit) 2 and during conveyance of the color chart CT in the backward feeding by the sub-scanning-directionally moving unit (sheet feeding unit) 2. Thus, the color measurement device CM in accordance with one or more embodiments and the color measurement method employed therein can detect the positional deviation amount (Δx, Δy) of the color chart CT occurring between the forward feeding and the backward feeding by using the entire image during the forward feeding and the partial image during the backward feeding, so as to correct a deviation between a position of a patch actually measured during the forward feeding and a measurement position of the patch during the backward feeding. Therefore, the color measurement device CM in accordance with one or more embodiments and the color measurement method employed therein can correct a positional deviation of the color chart CT occurring between the forward feeding and the backward feeding along one direction of the color chart CT, to measure a color of each patch at a more proper position.

In the color measurement device CM in accordance with one or more embodiments and the color measurement method employed therein, entire image-based extracted feature information and partial image-based extracted feature information each of which is a given feature extracted from a respective one of the entire image and the partial image are generated, and the positional deviation amount (Δx, Δy) of the color chart CT is derived by the cross-correlation operation based on the entire image-based extracted feature information and the partial image-based extracted feature information. Thus, in the color measurement device CM in accordance with one or more embodiments and the color measurement method employed therein, pattern matching can be performed by comporting the entire image and the partial image to each other based on the given features thereof. This makes it possible to more properly derive the positional deviation amount (Δx, Δy) of the color chart CT occurring between the forward feeding and the backward feeding.

In the color measurement device CM in accordance with one or more embodiments and the color measurement method employed therein, the entire image-based binarized edge projection graph data or the entire image-based edge line projection graph data may be used as the entire image-based extracted feature information. In this case, it becomes possible to reduce a processing load of the cross-correlation operation. In the color measurement device CM in accordance with one or more embodiments and the color measurement method employed therein, the partial image-based binarized edge projection graph data or the partial image-based edge line projection graph data may be used as the partial image-based extracted feature information. In this case, it becomes possible to reduce a processing load of the cross-correlation operation.

In the color measurement device CM in accordance with one or more embodiments and the color measurement method employed therein, a boundary (edge) between the patches themselves of the color chart CT is used as the given feature. Thus, the color measurement device CM in accordance with one or more embodiments and the color measurement method employed therein can more accurately derive the positional deviation amount (Δx, Δy) of the color chart CT.

It should be understood that in the color measurement device CM in accordance with the above embodiments, the positional deviation processing section 62 may be operable to divide the partial image into a plural number m of regions, and derive the positional deviation amount (Δx (m), Δy (m)) of the color chart CT with respect to each of the plural number m of regions. This color measurement device CM can derive a more proper positional deviation amount (Δx (m), Δy (m)) of the color chart CT even in a situation where deformation occurs in the color chart CT.

Figure 24:
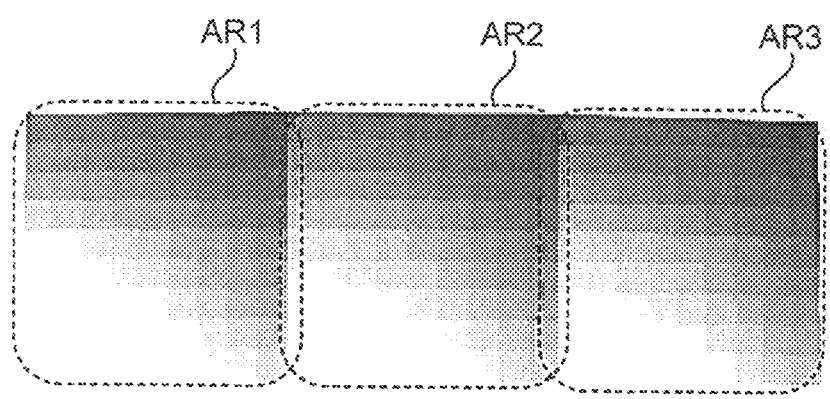
FIG. 24 is a diagram depicting, as one example, a partial image divided into a plurality of regions.
Figure 25A:
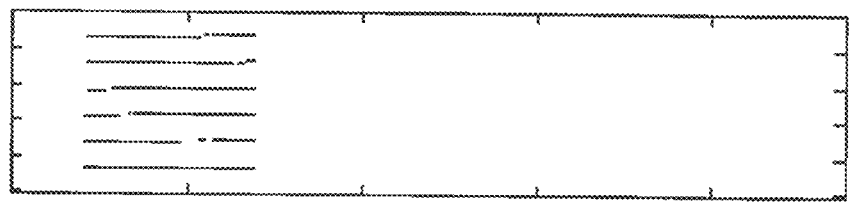
FIG. 25A is a diagram depicting, as one example, a partial image-based binarized horizontal edge image in a first one of the regions and a part of an entire image-based horizontal edge line image corresponding to the first region.
Figure 25B:
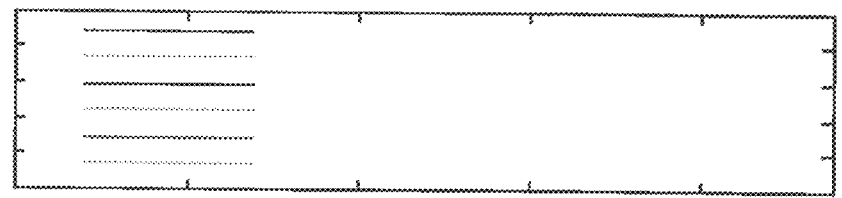
FIG. 25B is a second diagram depicting, as one example with FIG. 25A, a partial image-based binarized horizontal edge image in a first one of the regions and a part of an entire image-based horizontal edge line image corresponding to the first region.
Figure 26A:
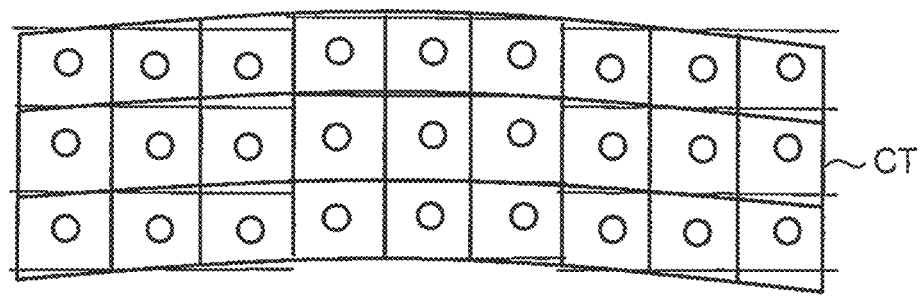
FIG. 26A is an explanatory diagram depicting, as one example, a position of each patch in the case where a color chart has deformation.

FIG. 24 is a diagram depicting, as one example, a partial image divided into a plurality of regions. FIG. 25 is a diagram depicting, as one example, a partial image-based binarized horizontal edge image in a first one of the regions and a part of an entire image-based horizontal edge line image corresponding to the first region. FIG. 25A depicts the partial image-based binarized horizontal edge image in the first region, and FIG. 25B depicts the part of the entire image-based horizontal edge line image corresponding to the first region. FIG. 26 is an explanatory diagram depicting, as one example, a position of each patch in the case where a color chart has deformation. FIG. 26A depicts each patch position corrected by a positional deviation amount in the case where the partial image is divided into a plurality of regions, and FIG. 26B depicts each patch position in the case where the partial image is not divided into a plurality of regions.

Figure 26B:
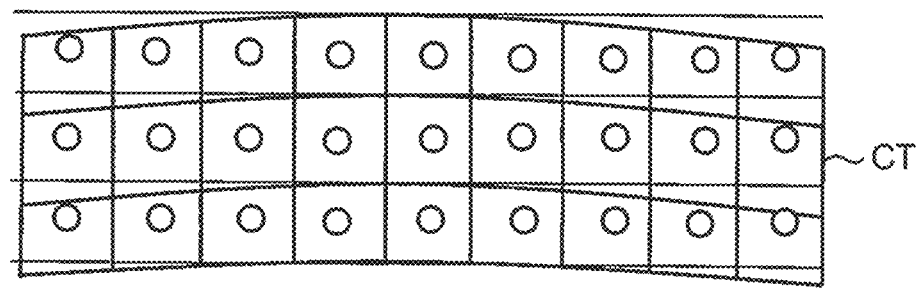
FIG. 26B is an explanatory diagram depicting, as one example with FIG. 26A, a position of each patch in the case where a color chart has deformation.

For example, in a situation where the color chart CT is deformed with a curvature with respect to the horizontal direction (x direction) as depicted in FIG. 26B, when each patch position (x, y) is derived by executing the processing S14, a straight line most similar to the deformed edge curve is detected. Thus, each patch position (x, y) is deviated more largely toward an edge (in FIG. 26B, left or right edge) of the color chart CT, as indicated by the mark "○" in FIG. 26B. Thus, considering that when the positional deviation amount (Δx, Δy) is derived by executing the processing S17, only one positional deviation amount (Δx, Δy) can be derived, although some patches in a certain region can be positionally corrected, positions of the remaining patches are likely to be unable to be sufficiently corrected.

Therefore, the positional deviation processing section 62 operates to divide the binarized edge image obtained from the partial image, into a plurality of regions. For example, the partial image depicted in FIG. 24 is long in the x direction. Thus, the partial image depicted in FIG. 24 is x-directionally divided into a plurality of regions. In the example depicted in FIG. 24, the partial image is divided into first to third regions AR1 to AR3. The partial image-based binarized edge image is also divided into three regions. Further, the entire image-based edge image is divided into corresponding three regions. FIG. 25A depicts, as one example, a partial image-based binarized horizontal edge image in the first region AR1, and FIG. 25B depicts a part of an entire image-based horizontal edge line image corresponding to the first region AR1. When the positional deviation amount (Δx (m), Δy (m)) of the color chart CT is derived with respect to each region ARm (m=1, 2, 3), it can be optimally derived with respect to each region ARm, as depicted in FIG. 26. Thus, even in the situation where deformation occurs in the color chart CT, this color measurement device CM can more properly derive the positional deviation amount (Δx (m), Δy (m)) of the color chart CT. Therefore, when a color of each color is measured in the processing S17, the color measuring unit 3 can be moved to a more properly corrected position, so that this color measurement device CM can properly measure the color of each patch.

In the above embodiments, the boundary (edge) between the patches of the color chart CT is used as the given feature, and the positional deviation amount ($\Delta x$, $\Delta y$) of the color chart CT is derived based on the boundary (edge) between the patches. However, the present invention is not limited thereto. For example, in the case where the color chart includes a position detection marker indicative of a position of each of the patches, the position detection marker of the color chart CT may be used as the given feature, and the positional deviation amount ($\Delta x$, $\Delta y$) of the color chart CT may be derived based on the position detection marker. In this color measurement device CM, the position detection marker located on the color chart CT is diverted to the given feature.

Figure 28:
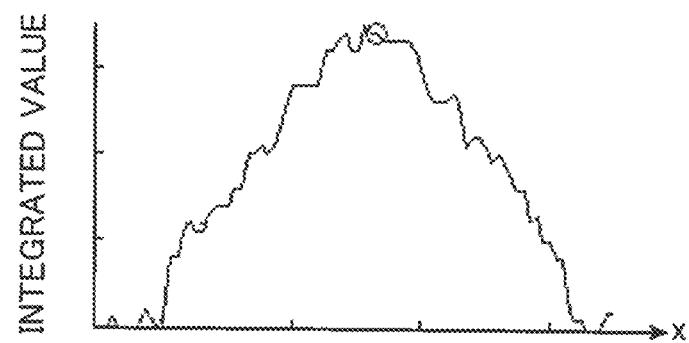
FIG. 28 is a chart depicting, as one example, a projection graph of a certain one of the position detection markers with respect to a horizontal line, in the color chart in FIG. 27.
Figure 29:
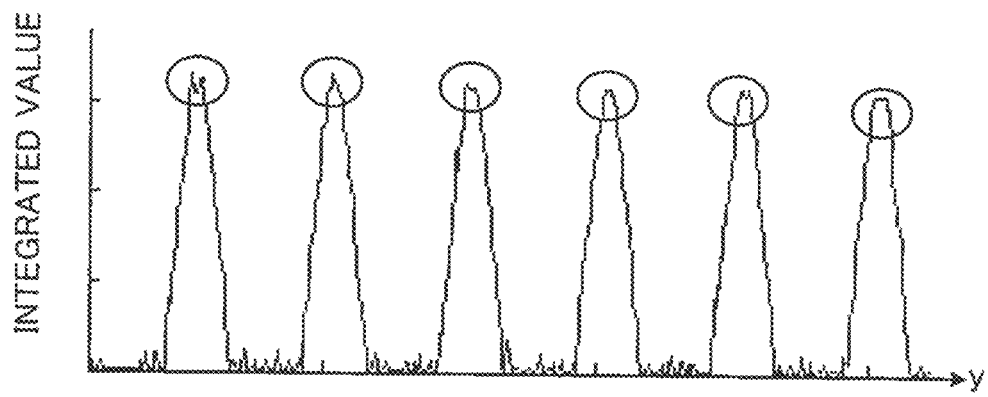
FIG. 29 is a chart depicting, as one example, a projection graph of the position detection markers with respect to a vertical line, in the color chart in FIG. 27.

FIG. 27 is a diagram depicting, as another example, an entire image of a color chart including a plurality of position detection markers. FIG. 28 is a chart depicting, as one example, a projection graph of a certain one of the position detection markers with respect to a horizontal line, in the color chart in FIG. 27. FIG. 29 is a chart depicting, as one example, a projection graph of the position detection markers with respect to a vertical line, in the color chart in FIG. 27.

In the case where such position detection markers are diverted to the given feature, in the processing S16, the positional deviation processing section 62 operates to: derive a center position (X0, Y0) of each of the position detection markers from the entire image; derive a center position (X1, Y1) of a respective one of the position detection markers from the partial image; and derive a difference between the center position (X0, Y0) of one of the position detection markers derived from the entire image and the center position (X1, Y1) of a corresponding one of the position detection markers derived from the partial image, as the positional deviation amount ($\Delta x$, $\Delta y$) of the color chart CT ($\Delta x = X1 - X0$, $\Delta y = Y1 - Y0$).

More specifically, in the case of deriving the horizontal (x-directional) positional deviation amount $\Delta x$, the positional deviation processing section 62 operates to, in the entire image data (image data of the entire image), integrate respective pixel values of all of a plurality of pixels having the same x-coordinate value, with respect to each x-coordinate value on the x axis and in each area on which a respective one of the position detection markers is located. That is, the pixel values of the pixels are integrated along the y direction to derive an integrated value thereof. Then, the positional deviation processing section 62 operates to derive a coordinate value on the x axis providing a peak of an entire image-based projection graph with respect to the horizontal line, as a horizontal center position X0 of the position detection marker derived from the entire image.

For example, in a color chart CTa depicted in FIG. 27, a plurality of position detection markers are arranged on each side of a patch region along the y direction. When data of an area of the entire image on which one of the position detection markers is located is projected, an entire image-based projection graph with respect to the horizontal line is derived as depicted in FIG. 28. Then, a peak (indicated by the mark "○" in FIG. 28) of the entire image-based projection graph with respect to the horizontal line as depicted in FIG. 28 is derived as the horizontal center position X0 of the position detection marker derived from the entire image.

The positional deviation processing section 62 also operates to process the image data of the partial image in the same manner as described above, to thereby derive a horizontal center position X1 of the position detection marker from the partial image.

Then, the positional deviation processing section 62 operates to derive a difference between the horizontal center position X0 of the position detection marker derived from the entire image and the horizontal center position X1 of the position detection marker derived from the partial image, as the horizontal positional deviation amount $\Delta x$ of the color chart CT. The positional deviation amount $\Delta x$ is derived with respect to each marker.

On the other hand, in the case of deriving the vertical (y-directional) positional deviation amount $\Delta y$, the positional deviation processing section 62 operates to, in the entire image data (image data of the entire image), integrate respective pixel values of all of a plurality of pixels having the same y-coordinate value, with respect to each y-coordinate value on the y axis and in each area on which a respective one of the position detection markers is located. That is, the pixel values of the pixels are integrated along the x direction to derive an integrated value thereof. Then, the positional deviation processing section 62 operates to derive a coordinate value on the y axis providing a peak of an entire image-based projection graph with respect to the vertical line, as a vertical center position Y0 of the position detection marker derived from the entire image.

For example, in the color chart CTa depicted in FIG. 27, when data of an area of the entire image on which one of the position detection markers is located is projected, an entire image-based projection graph with respect to the vertical line is derived as depicted in FIG. 29. Then, a peak (indicated by the mark "○" in FIG. 29) of the entire image-based projection graph with respect to the vertical line as depicted in FIG. 28 is derived as the vertical center position Y0 of the position detection marker derived from the entire image. In the example depicted in FIG. 27, the plurality of position detection markers are arranged in the y direction. Thus, the vertical center position Y0 of the position detection marker is plurally derived from the entire image.

The positional deviation processing section 62 also operates to process the image data of the partial image in the same manner as described above, to thereby derive a vertical center position Y1 of the position detection marker from the partial image.

Then, the positional deviation processing section 62 operates to derive a difference between the vertical center position Y0 of the position detection marker derived from the entire image and the vertical center position Y1 of the position detection marker derived from the partial image, as the vertical positional deviation amount $\Delta y$ of the color chart CT.

In the example depicted in FIG. 27, the plurality of position detection markers are arranged in the y direction. Thus, for example, the vertical positional deviation amount $\Delta y$ of the color chart CT may be derived with respect to each position detection marker. In this case, for example, an average value of the resulting vertical positional deviation amounts $\Delta y$ may be used as the vertical positional deviation amount $\Delta y$ of the color chart CT.

In the above embodiments, the positional deviation amount ($\Delta x$, $\Delta y$) of the color chart CT is derived from the difference between the center position (X0, Y0) of one of the position detection markers derived from the entire image and the center position (X1, Y1) of a corresponding one of the position detection markers derived from the partial image. Alternatively, the positional deviation amount (Δx, Δy) of the color chart CT may be derived by a cross-correlation operation of the entire image-based vertical projection graph data and the partial image-based vertical projection graph data, and a cross-correlation operation of the entire image-based horizontal projection graph data and the partial image-based horizontal projection graph data, in the same manner as described above. Alternatively, the positional deviation amount (Δx, Δy) of the color chart CT may be derived by a cross-correlation operation of the entire image and the partial image, in an area on which each of the position detection markers is located.

Regarding "conveyance" and "re-conveyance", for the sake of easy understanding, the entire, the above embodiments has been described based on an example where the entire image is acquired during forward feeding (one example of the conveyance) of the color chart CT and the partial image is acquired during backward feeding (one example of the re-conveyance) of the color chart CT. Alternatively, the entire image may be acquired during forward feeding (one example of the conveyance) of the color chart CT, and the partial image may be acquired during the forward feeding of the color chart CT to be performed after the color chart CT is returned to its original position (this forward feeding is also one example of the re-conveyance).

This specification discloses various techniques as mentioned above. Among them, major techniques will be outlined as follows.

According to one aspect, there is provided a color measurement device which includes: a color measuring unit which measures a color; a moving unit which moves the color measuring unit along a given first direction; a conveyance unit which conveys and re-conveys a color chart having a plurality of patches each of which is a region of a given color, along a second direction orthogonal to the first direction; an imaging unit which acquires an image; a positional deviation processing section which acquires an entire image of the color chart by causing the imaging unit to image the color chart while causing the conveyance unit to convey the color chart; acquires a partial image of the color chart by causing the imaging unit to image the color chart while causing the conveyance unit to re-convey the color chart; and, based on the acquired entire and partial images, derives an amount of positional deviation of the color chart occurring between the conveyance and the re-conveyance; and a color measurement processing section which causes the color measuring unit to measure the color of each of the plurality of patches, while correcting a measurement position at which the color measuring unit performs the color measurement, according to the amount of positional deviation of the color chart derived by the positional deviation processing section.

In the color measurement device having the above feature, an entire image and a partial image of the color chart are acquired, respectively, during the conveyance of the color chart by the conveyance unit and during the re-conveyance of the color chart by the conveyance unit. Thus, this color measurement device can detect the positional deviation amount of the color chart occurring between the conveyance and the re-conveyance by using the entire image during the conveyance and the partial image during the re-conveyance, so as to correct a deviation between a position of the patch actually measured during the conveyance and a measurement position of the patch during the re-conveyance. Therefore, this color measurement device can correct the positional deviation of the color chart occurring between the conveyance and the re-conveyance along one direction of the color chart, to measure a color of each patch at a more proper position.

In one or more embodiments, the positional deviation processing section of the color measurement device includes: a feature extraction processing subsection which generates entire image-based extracted feature information and partial image-based extracted feature information each of which is a given feature extracted from a respective one of the entire image and the partial image; and a positional deviation amount calculation processing subsection which derives the amount of positional deviation of the color chart, based on the entire image-based extracted feature information and the partial image-based extracted feature information generated by the feature extraction processing subsection.

In the color measurement device having this feature, the entire image-based extracted feature information and the partial image-based extracted feature information each of which is a given feature extracted from a respective one of the entire image and the partial image are generated, and the positional deviation amount of the color chart is derived based on the entire image-based extracted feature information and the partial image-based extracted feature information. Thus, in this color measurement device, the entire image and the partial image are compared with each other based on the given features thereof. This makes it possible to more properly derive the positional deviation amount of the color chart occurring between the conveyance and the re-conveyance.

In one or more embodiments, the entire image-based extracted feature information of the color measurement device is one selected from the group consisting of entire image data which is image data of the entire image itself, entire image-based binarized edge image data, entire image-based edge line image data, entire image-based binarized edge projection graph data, and entire image-based edge line projection graph data, wherein the feature extraction processing subsection is operable: when the entire image-based extracted feature information is the entire image-based binarized edge image data, to subject the entire image to binarization processing, using an edge filter for use in detecting an edge extending in one direction in an image, to thereby generate the entire image-based binarized edge image data; when the entire image-based extracted feature information is the entire image-based edge line image data, to subject the entire image to the binarization processing, using the edge filter for use in detecting an edge extending in one direction in an image, to thereby generate the entire image-based binarized edge image data, and further subject the generated entire image-based binarized edge image data to a Hough transform to thereby generate the entire image-based edge line image data; when the entire image-based extracted feature information is the entire image-based binarized edge projection graph data, to subject the entire image to the binarization processing, using the edge filter for use in detecting an edge extending in one direction in an image, to thereby generate the entire image-based binarized edge image data, and further integrate and project pixel values of a plurality of pixels in the generated entire image-based binarized edge image data, along the one direction to thereby generate the entire image-based binarized edge projection graph data; and when the entire image-based extracted feature information is the entire image-based edge line projection graph data, to subject the entire image to the binarization processing, using the edge filter for use in detecting an edge extending in one direction in an image, to thereby generate the entire image-based binarized edge image data, and, after further subjecting the generated entire image-based binarized edge image data to a Hough transform to thereby generate the entire image-based edge line image data, further integrate and project pixel values of a plurality of pixels in the generated entire image-based edge line image data, along the one direction to thereby generate the entire image-based edge line projection graph data.

This provides a color measurement device using, as the entire image-based extracted feature information, one selected from the group consisting of the entire image data which is image data of the entire image itself, the entire image-based binarized edge image data, the entire image-based edge line image data, the entire image-based binarized edge projection graph data, and the entire image-based edge line projection graph data. In the case where the entire image-based binarized edge projection graph data or the entire image-based edge line projection graph data may be used as the entire image-based extracted feature information. In this case, it becomes possible to reduce a processing load of the cross-correlation operation.

In one or more embodiments, the partial image-based extracted feature information of the color measurement device is one selected from the group consisting of partial image data which is image data of the partial image itself, partial image-based binarized edge image data, partial image-based edge line image data, partial image-based binarized edge projection graph data, and partial image-based edge line projection graph data, wherein the feature extraction processing subsection is operable: when the partial image-based extracted feature information is the partial image-based binarized edge image data, to subject the partial image to binarization processing, using an edge filter for use in detecting an edge extending in one direction in an image, to thereby generate the partial image-based binarized edge image data; when the partial image-based extracted feature information is the partial image-based edge line image data, to subject the partial image to the binarization processing, using the edge filter for use in detecting an edge extending in one direction in an image, to thereby generate the partial image-based binarized edge image data, and further subject the generated partial image-based binarized edge image data to a Hough transform to thereby generate the partial image-based edge line image data; when the partial image-based extracted feature information is the partial image-based binarized edge projection graph data, to subject the partial image to the binarization processing, using the edge filter for use in detecting an edge extending in one direction in an image, to thereby generate the partial image-based binarized edge image data, and further integrate and project pixel values of a plurality of pixels in the generated partial image-based binarized edge image data, along the one direction to thereby generate the partial image-based binarized edge projection graph data; and when the partial image-based extracted feature information is the partial image-based edge line projection graph data, to subject the partial image to the binarization processing, using the edge filter for use in detecting an edge extending in one direction in an image, to thereby generate the partial image-based binarized edge image data, and, after further subjecting the generated partial image-based binarized edge image data to a Hough transform to thereby generate the partial image-based edge line image data, further integrate and project pixel values of a plurality of pixels in the generated partial image-based edge line image data, along the one direction to thereby generate the partial image-based edge line projection graph data.

This provides a color measurement device using, as the partial image-based extracted feature information, one selected from the group consisting of the partial image data which is image data of the partial image itself, the partial image-based binarized edge image data, the partial image-based edge line image data, the partial image-based binarized edge projection graph data, and the partial image-based edge line projection graph data. In the case where the partial image-based binarized edge projection graph data or the partial image-based edge line projection graph data is used as the partial image-based extracted feature information, it becomes possible to reduce a processing load of the cross-correlation operation.

In one or more embodiments, the given feature of the color measurement device is a boundary between the patches of the color chart.

In the color measurement device having this feature, a boundary between the patches themselves of the color chart is used as the given feature. Thus, it becomes possible to more accurately derive the positional deviation amount of the color chart.

In one or more embodiments, the color chart of the color measurement device includes a position detection marker indicative of a position of each of the patches, wherein the given feature is the position detection marker of the color chart.

This provides a color measurement device in which the position detection marker located on the color chart is diverted to the given feature.

In one or more embodiments, the positional deviation processing section of the color measurement device is operable to divide the partial image into a plurality of regions, and derive the amount of positional deviation of the color chart with respect to each of the plurality of regions.

In the color measurement device having this feature, the partial image is divided into a plurality of regions, and the amount of positional deviation of the color chart is derived with respect to each of the plurality of regions. Thus, it becomes possible to derive a more proper positional deviation amount of the color chart even in a situation where deformation occurs in the color chart.

According to another aspect, there is provided a color measurement method for measuring respective colors of a plurality of patches each of which is a region of a given color, wherein a color chart having the plurality of patches is conveyed by a conveyance unit, along a second direction orthogonal to a given first direction, so as to derive a position of each of the patches, and a color measuring unit is moved in the first direction in a state in which the color chart is being re-conveyed by the conveyance unit, so as to move the color measuring unit to the derived position of each of the patches. The color measurement method includes: an entire image acquisition step of acquiring an entire image of the color chart by causing an imaging unit to image the color chart while causing the conveyance unit to convey the color chart along the second direction; a partial image acquisition step of acquiring a partial image of the color chart by causing the imaging unit to image the color chart while causing the conveyance unit to re-convey the color chart along the second direction; a positional deviation processing step of, based on the entire image acquired in the entire image acquisition step and the partial image acquired in the partial image acquisition step, deriving an amount of positional deviation of the color chart occurring between the conveyance and the re-conveyance; and a color measurement processing step of causing the color measuring unit to measure the color of each of the plurality of patches, while correcting a measurement position at which the color measuring unit performs the color measurement, according to the amount of positional deviation of the color chart derived in the positional deviation processing step.

In the color measurement method having the above feature, an entire image and a partial image of the color chart are acquired, respectively, during the conveyance of the color chart by the conveyance unit and during the re-conveyance of the color chart by the conveyance unit. Thus, this color measurement method makes it possible to detect the positional deviation amount of the color chart occurring between the conveyance and the re-conveyance by using the entire image during the conveyance and the partial image during the re-conveyance, so as to correct a deviation between a position of the patch actually measured during the conveyance and a measurement position of the patch during the re-conveyance. Therefore, this color measurement method makes it possible to correct the positional deviation of the color chart occurring between the conveyance and the re-conveyance along one direction of the color chart, to measure a color of each patch at a more proper position.

This application is based on Japanese Patent Application Serial No. 2014-92621 filed in Japan Patent Office on Apr. 28, 2014, the contents of which are hereby incorporated by reference.

Although the present invention has been described appropriately and fully by way of the embodiments as above with reference to the drawings in order to express the present invention, it should be appreciated that anyone skilled in the art can readily change and/or modify the embodiments described above. It is therefore understood that any changed embodiments or modified embodiments implemented by anyone skilled in the art is encompassed within the scope of the appended claims unless the changed embodiments or the modified embodiments are of a level that deviates from the scope of the appended claims.

Further, although the disclosure has been described with respect to only a limited number of embodiments, those skilled in the art, having benefit of this disclosure, will appreciate that various other embodiments may be devised without departing from the scope of the present invention. Accordingly, the scope of the invention should be limited only by the attached claims.

INDUSTRIAL APPLICABILITY

Embodiments of the present invention can provide a color measurement device and a color measurement method.

The invention claimed is:
1. A color measurement device comprising:
a color measuring sensor that measures a color and that moves along a first direction;
a conveyance roller that:
  conveys a color chart along a second direction and re-conveys the color chart along the second direction, wherein the color chart comprises a plurality of patches, wherein each patch comprises a region of a given color, wherein the second direction is orthogonal to the first direction;
an imaging sensor that acquires an image;
a positional deviation processing circuit that:
  acquires an entire image of the color chart by causing the imaging sensor to image the color chart while causing the conveyance roller to convey the color chart;
  acquires a partial image of the color chart by causing the imaging sensor to image the color chart while causing the conveyance roller to re-convey the color chart; and
  derives, based on the acquired entire and partial images, an amount of positional deviation of the color chart occurring between the conveyance and the re-conveyance; and
a color measurement processing circuit that causes the color measuring sensor to measure the color of each of the plurality of patches, while correcting a measurement position at which the color measuring sensor performs the color measurement, based on the amount of positional deviation of the color chart derived by the positional deviation processing circuit.

2. The color measurement device as recited in claim 1, wherein the positional deviation processing circuit comprises:
a feature extraction processing circuit that generates entire image-based extracted feature information and partial image-based extracted feature information each of which is a given feature extracted from a respective one of the entire image and the partial image; and
a positional deviation amount calculation processing circuit that derives the amount of positional deviation of the color chart, based on the entire image-based extracted feature information and the partial image-based extracted feature information generated by the feature extraction processing circuit.

3. The color measurement device as recited in claim 2, wherein the entire image-based extracted feature information is one selected from the group consisting of entire image data which is image data of the entire image itself, entire image-based binarized edge image data, entire image-based edge line image data, entire image-based binarized edge projection graph data, and entire image-based edge line projection graph data, and wherein
when the entire image-based extracted feature information is the entire image-based binarized edge image data, the feature extraction processing circuit subjects the entire image to binarization processing, using an edge filter for use in detecting an edge extending in one direction in an image, to generate the entire image-based binarized edge image data;
when the entire image-based extracted feature information is the entire image-based edge line image data, the feature extraction processing circuit subjects the entire image to the binarization processing, using the edge filter for use in detecting an edge extending in one direction in an image, to generate the entire image-based binarized edge image data, and further subject the generated entire image-based binarized edge image data to a Hough transform to generate the entire image-based edge line image data;
when the entire image-based extracted feature information is the entire image-based binarized edge projection graph data, the feature extraction processing circuit subjects the entire image to the binarization processing, using the edge filter for use in detecting an edge extending in one direction in an image, to generate the entire image-based binarized edge image data, and further integrate and project pixel values of a plurality of pixels in the generated entire image-based binarized edge image data, along the one direction to generate the entire image-based binarized edge projection graph data; and when the entire image-based extracted feature information is the entire image-based edge line projection graph data, the feature extraction processing circuit subjects the entire image to the binarization processing, using the edge filter for use in detecting an edge extending in one direction in an image, to generate the entire image-based binarized edge image data, and, after further subjecting the generated entire image-based binarized edge image data to a Hough transform to generate the entire image-based edge line image data, further integrate and project pixel values of a plurality of pixels in the generated entire image-based edge line image data, along the one direction to generate the entire image-based edge line projection graph data.

4. The color measurement device as recited in claim 3, wherein the partial image-based extracted feature information is one selected from the group consisting of partial image data which is image data of the partial image itself, partial image-based binarized edge image data, partial image-based edge line image data, partial image-based binarized edge projection graph data, and partial image-based edge line projection graph data, and wherein when the partial image-based extracted feature information is the partial image-based binarized edge image data, the feature extraction processing circuit subjects the partial image to binarization processing, using an edge filter for use in detecting an edge extending in one direction in an image, to generate the partial image-based binarized edge image data;

when the partial image-based extracted feature information is the partial image-based edge line image data, the feature extraction processing circuit subjects the partial image to the binarization processing, using the edge filter for use in detecting an edge extending in one direction in an image, to generate the partial image-based binarized edge image data, and further subject the generated partial image-based binarized edge image data to a Hough transform to generate the partial image-based edge line image data;

when the partial image-based extracted feature information is the partial image-based binarized edge projection graph data, the feature extraction processing circuit subjects the partial image to the binarization processing, using the edge filter for use in detecting an edge extending in one direction in an image, to generate the partial image-based binarized edge image data, and further integrate and project pixel values of a plurality of pixels in the generated partial image-based binarized edge image data, along the one direction to generate the partial image-based binarized edge projection graph data; and when the partial image-based extracted feature information is the partial image-based edge line projection graph data, the feature extraction processing circuit subjects the partial image to the binarization processing, using the edge filter for use in detecting an edge extending in one direction in an image, to generate the partial image-based binarized edge image data, and, after further subjecting the generated partial image-based binarized edge image data to a Hough transform to generate the partial image-based edge line image data, further integrate and project pixel values of a plurality of pixels in the generated partial image-based edge line image data, along the one direction to generate the partial image-based edge line projection graph data.

5. The color measurement device as recited in claim 2, wherein the partial image-based extracted feature information is one selected from the group consisting of partial image data which is image data of the partial image itself, partial image-based binarized edge image data, partial image-based edge line image data, partial image-based binarized edge projection graph data, and partial image-based edge line projection graph data, and wherein when the partial image-based extracted feature information is the partial image-based binarized edge image data, the feature extraction processing circuit subjects the partial image to binarization processing, using an edge filter for use in detecting an edge extending in one direction in an image, to generate the partial image-based binarized edge image data;

when the partial image-based extracted feature information is the partial image-based edge line image data, the feature extraction processing circuit subjects the partial image to the binarization processing, using the edge filter for use in detecting an edge extending in one direction in an image, to generate the partial image-based binarized edge image data, and further subject the generated partial image-based binarized edge image data to a Hough transform to generate the partial image-based edge line image data;

when the partial image-based extracted feature information is the partial image-based binarized edge projection graph data, the feature extraction processing circuit subjects the partial image to the binarization processing, using the edge filter for use in detecting an edge extending in one direction in an image, to generate the partial image-based binarized edge image data, and further integrate and project pixel values of a plurality of pixels in the generated partial image-based binarized edge image data, along the one direction to generate the partial image-based binarized edge projection graph data; and when the partial image-based extracted feature information is the partial image-based edge line projection graph data, the feature extraction processing circuit subjects the partial image to the binarization processing, using the edge filter for use in detecting an edge extending in one direction in an image, to generate the partial image-based binarized edge image data, and, after further subjecting the generated partial image-based binarized edge image data to a Hough transform to generate the partial image-based edge line image data, further integrate and project pixel values of a plurality of pixels in the generated partial image-based edge line image data, along the one direction to generate the partial image-based edge line projection graph data.

6. The color measurement device as recited in claim 2, wherein the given feature is a boundary between the patches of the color chart.

7. The color measurement device as recited in claim 2, wherein the color chart further comprises a position detection marker indicative of a position of each of the patches, and wherein the given feature is the position detection marker of the color chart.

8. The color measurement device as recited in claim 1, wherein the positional deviation processing circuit divides the partial image into a plurality of regions, and derives the amount of positional deviation of the color chart with respect to each of the plurality of regions.

9. A color measurement method for measuring respective colors of a plurality of patches each of which is a region of a given color, wherein a color chart having the plurality of patches is conveyed by a conveyance roller, along a second direction orthogonal to a first direction, so as to derive a position of each of the patches, and a color measuring sensor is moved in the first direction in a state in which the color chart is being re-conveyed by the conveyance roller, so as to move the color measuring sensor to the derived position of each of the patches, the color measurement method comprising:

acquiring an entire image of the color chart by causing an imaging sensor to image the color chart while causing the conveyance roller to convey the color chart along the second direction;

acquiring a partial image of the color chart by causing the imaging sensor to image the color chart while causing the conveyance roller to re-convey the color chart along the second direction;

deriving, based on the entire image and the partial image, an amount of positional deviation of the color chart occurring between the conveyance and the re-conveyance; and measure the color of each of the plurality of patches by causing the color measuring sensor to measure the color of each of the plurality of patches, while correcting a measurement position at which the color measuring sensor performs the color measurement, based on the amount of positional deviation of the color chart derived in the positional deviation processing step.

\* \* \* \* \*